US010377260B2

(12) United States Patent
Donnelly et al.

(10) Patent No.: US 10,377,260 B2
(45) Date of Patent: Aug. 13, 2019

(54) CHARGE CONTROL SYSTEM FOR MOBILE ENERGY STORAGE FLEET

(71) Applicant: Uber Technologies, Inc., San Francisco, CA (US)

(72) Inventors: Richard Brian Donnelly, Pittsburgh, PA (US); Sean Jeffrey Kelly, Pittsburgh, PA (US); Justin Wayne Ho, San Francisco, CA (US); James Lee Epifano, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 131 days.

(21) Appl. No.: 15/405,581

(22) Filed: Jan. 13, 2017

(65) Prior Publication Data

US 2018/0201148 A1 Jul. 19, 2018

(51) Int. Cl.
*B60L 58/13* (2019.01)
*B60L 11/18* (2006.01)
(Continued)

(52) U.S. Cl.
CPC .......... *B60L 11/1862* (2013.01); *B60L 53/36* (2019.02); *B60L 53/38* (2019.02); *B60L 53/64* (2019.02);
(Continued)

(58) Field of Classification Search
CPC .............. B60L 11/1862; B60L 11/1842; B60L 11/1861; B60L 11/1848; B60L 11/1833;
(Continued)

(56) References Cited

U.S. PATENT DOCUMENTS 9,193,273 B1 11/2015 Frank et al.
2002/0132144 A1* 9/2002 McArthur ........... B60L 15/2045
429/513
(Continued)

FOREIGN PATENT DOCUMENTS

EP 2755100 7/2014
WO WO 2015/151432 10/2015

OTHER PUBLICATIONS

Partial International Search Report for PCT/US2018/012323, dated Jun. 26, 2018, 15 pages.

*Primary Examiner* — Mary Cheung
(74) *Attorney, Agent, or Firm* — Dority & Manning, P.A.

(57) ABSTRACT

Vehicle control systems can include one or more location sensors, an energy storage device, one or more charge sensors and one or more vehicle computing devices. The location sensor(s) can determine a current location of a vehicle, while the charge sensor(s) can determine a current state of charge of an energy storage device that can be located onboard the vehicle to provide operating power for one or more vehicle systems. The vehicle computing device(s) can communicate the current location of the vehicle and current state of charge of the energy storage device to a remote computing device, receive from the remote computing device a charging control signal determined, at least in part, from the current location of the vehicle and the current state of charge of the energy storage device, and control charging of the energy storage device in accordance with the charging control signal.

20 Claims, 14 Drawing Sheets

(51) Int. Cl.

| | | |
|---|---|---|
| *B60W 20/13* | (2016.01) | |
| *G05D 1/00* | (2006.01) | |
| *G06Q 30/02* | (2012.01) | |
| *G06Q 50/06* | (2012.01) | |
| *G07C 5/00* | (2006.01) | |
| *H02J 7/00* | (2006.01) | |
| *H02J 7/02* | (2016.01) | |
| *B60L 53/38* | (2019.01) | |
| *B60L 53/36* | (2019.01) | |
| *B60L 53/64* | (2019.01) | |
| *B60L 55/00* | (2019.01) | |
| *B60L 53/66* | (2019.01) | |
| *B60L 58/12* | (2019.01) | |

(52) U.S. Cl.
CPC ............. *B60L 53/665* (2019.02); *B60L 55/00* (2019.02); *B60L 58/12* (2019.02); *B60L 58/13* (2019.02); *B60W 20/13* (2016.01); *G05D 1/0088* (2013.01); *G06Q 30/0283* (2013.01); *G06Q 50/06* (2013.01); *G07C 5/008* (2013.01); *H02J 7/0021* (2013.01); *H02J 7/025* (2013.01); *B60L 2240/62* (2013.01); *B60L 2240/70* (2013.01); *B60L 2260/32* (2013.01); *H02J 2007/0001* (2013.01); *Y02E 60/721* (2013.01); *Y02T 10/7005* (2013.01); *Y02T 10/705* (2013.01); *Y02T 10/7044* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/169* (2013.01); *Y04S 10/126* (2013.01); *Y04S 30/14* (2013.01); *Y04S 50/14* (2013.01)

(58) Field of Classification Search
CPC ................ B60L 11/1829; B60L 11/184; B60L ql2240/62; B60L 2240/70; B60L 2260/32; G05D 1/0088; G06Q 30/0283; G06Q 50/06; G07C 5/008; B60W 20/13; H02J 2007/0001; H02J 7/0001; H02J 7/025; Y02T 90/162; Y02T 90/16; Y02T 10/705; Y02T 90/163; Y02T 10/7072; Y02T 90/128; Y02T 10/7044; Y02T 90/14; Y02T 90/121; Y02T 10/7291; Y02T 90/169; Y02T 10/7005; Y04S 30/14; Y04S 10/54; Y04S 10/126; Y04S 50/14; Y02E 60/721

See application file for complete search history.

(56) References Cited

U.S. PATENT DOCUMENTS

| | | | | |
|---|---|---|---|---|
| 2007/0282495 | A1* | 12/2007 | Kempton | .................. B60L 8/00 701/22 |
| 2009/0313103 | A1* | 12/2009 | Ambrosio | ................. B60L 8/00 705/14.25 |
| 2011/0282513 | A1* | 11/2011 | Son | ..................... B60L 11/1816 700/297 |
| 2013/0046411 | A1* | 2/2013 | Al Faruque | ............... H02J 3/32 700/286 |
| 2014/0203077 | A1* | 7/2014 | Gadh | ........................ H02J 7/00 235/382 |
| 2014/0266004 | A1* | 9/2014 | Andrews, Jr. | ......... B60L 11/005 320/104 |
| 2015/0006249 | A1* | 1/2015 | Marshall | ............ G06Q 30/0205 705/7.31 |
| 2015/0039391 | A1* | 2/2015 | Hershkovitz | .......... G06Q 10/04 705/7.31 |
| 2015/0224889 | A1* | 8/2015 | Ono | .................... B60L 11/1814 701/22 |
| 2015/0239365 | A1* | 8/2015 | Hyde | .................. B60L 11/1861 701/2 |
| 2015/0294329 | A1 | 10/2015 | Saito et al. | |
| 2015/0298567 | A1 | 10/2015 | Uyeki | |
| 2016/0132947 | A1 | 5/2016 | Bollman, IV | |

\* cited by examiner

CHARGE CONTROL SYSTEM FOR MOBILE ENERGY STORAGE FLEET

FIELD

The present disclosure relates generally to charge control systems and methods for a mobile energy storage fleet including respective energy storage devices.

BACKGROUND

Fleet operators that manage a relatively large fleet of vehicles can often expend a significant amount of time, manpower and financial resources to maintain a proper operating level for the vehicles. When a fleet includes electric vehicles, maintenance costs can include those associated with charging the energy storage devices within the vehicles (e.g., the cost of power purchased from an energy provider to recharge energy storage devices) as well as a value of time lost to charging when the vehicles could otherwise be operating to provide a service (e.g., a transportation service).

SUMMARY

Aspects and advantages of embodiments of the present disclosure will be set forth in part in the following description, or may be learned from the description, or may be learned through practice of the embodiments.

One example aspect of the present disclosure is directed to a vehicle control system including one or more location sensors for determining a current location of a vehicle. The vehicle control system also includes an energy storage device located onboard the vehicle and configured to provide operating power for one or more vehicle systems The vehicle control system also includes one or more charge sensors configured to determine a current state of charge of the energy storage device. The vehicle control system also includes one or more vehicle computing devices configured to communicate the current location of the vehicle and the current state of charge of the energy storage device to one or more remote computing devices located remotely from the vehicle. The one or more vehicle computing devices are also configured to receive, from the one or more remote computing devices, a charging control signal determined, at least in part, from the current location of the vehicle and the current state of charge of the energy storage device. The one or more vehicle computing devices are also configured to control charging of the energy storage device in accordance with the charging control signal.

Another example aspect of the present disclosure is directed to a computer-implemented method for controlling charge of a fleet of vehicles. The method includes receiving, by one or more computing devices, current status indicators from a plurality of vehicles. The method also includes receiving, by the one or more computing devices, one or more electric grid signals indicating current status or power pricing information for an electric grid. The method also includes determining, by the one or more computing devices, charging control signals for each of the plurality of vehicles, wherein the charging control signals are determined, at least in part, from the current status indicators of the vehicles and the one or more electric grid signals indicating current status or power pricing information for the electric grid. The method also includes providing, by the one or more computing devices, the charging control signals to the plurality of vehicles to control charging of the energy storage devices at the plurality of electric vehicles in accordance with the charging control signals.

Yet another aspect of the present disclosure is directed to a charging structure including a plurality of charging stations, an energy transfer system and a charge controller. Each charging station is configured to electrically couple to an energy storage device for use with a fleet of vehicles. The energy transfer system is configured to interface with the energy storage devices at each charging station and selectively charge the energy storage devices. The charge controller is coupled to the energy transfer system and configured to determine, by one or more computing devices, a sensed state of charge for each energy storage device. The charge controller is also configured to control, by the one or more computing devices, charge of each energy storage device in accordance with one or more charging control signals, wherein the charging control signals are determined, at least in part, from the sensed state of charge for each energy storage device and one or more electric grid signals indicating current status or power pricing information for an electric grid.

Other example aspects of the present disclosure are directed to systems, methods, apparatuses, tangible, non-transitory computer-readable media, user interfaces, memory devices, and vehicles including energy storage and control features.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
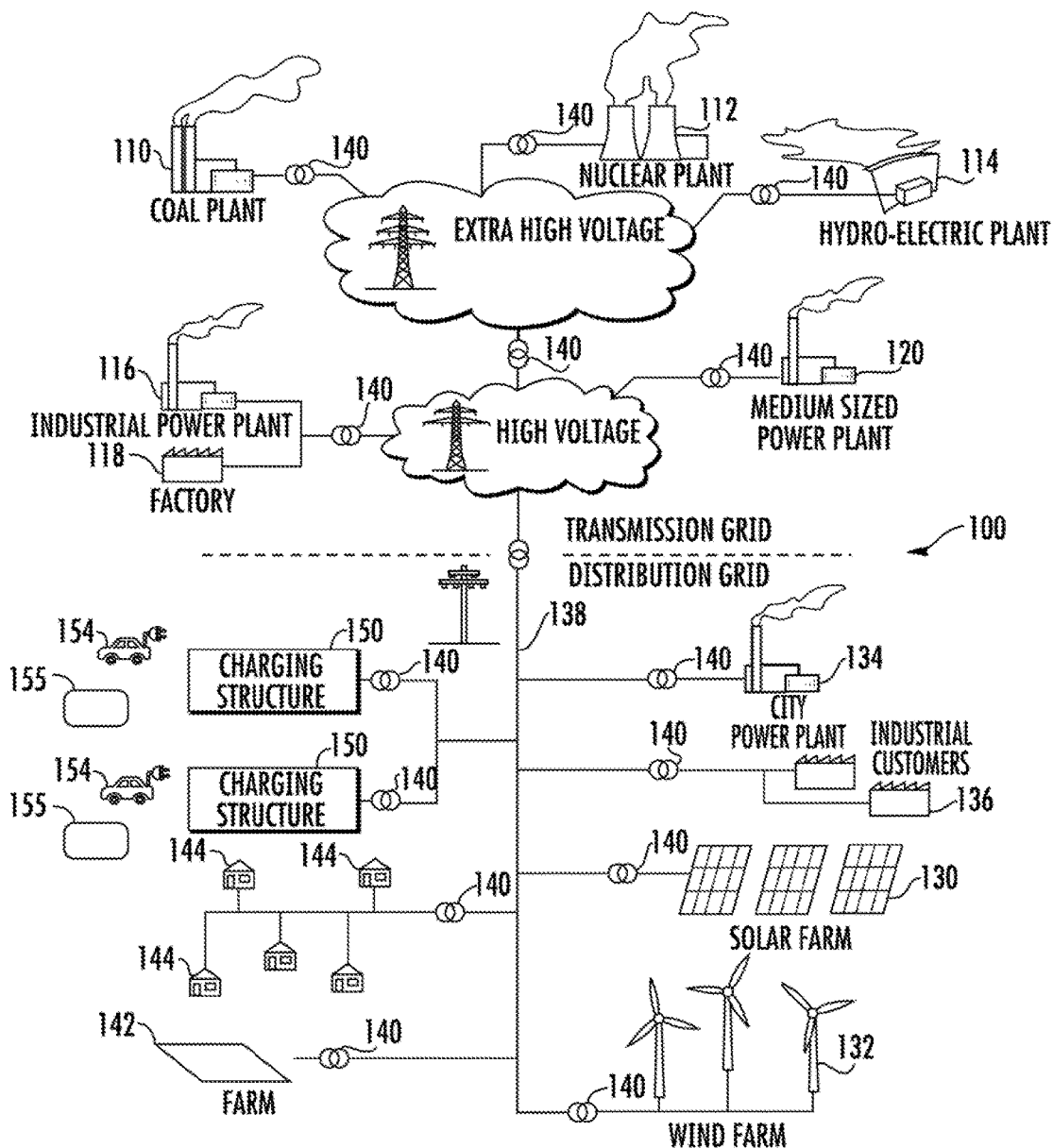
FIG. 1 depicts an example electrical energy infrastructure (e.g., electric grid) including charging structures according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to charge control systems and methods for a mobile energy storage fleet. Energy storage devices can be included to provide some or all operating power for a fleet of vehicles (e.g., electric vehicles, extended range electric vehicles, hybrid vehicles, battery electric vehicles, electric autonomous vehicles, etc.). Each vehicle in the fleet can be provided with one or more sensors for providing current status indicators for the vehicle. For example, one or more location sensors can determine a current location of the vehicle and/or one or more charge sensors can determine a current state of charge of an energy storage device at the vehicle. Charge control systems and/or methods can control charging of an energy storage device associated with each vehicle in accordance with a charging control signal that is determined at the vehicle or at a central control system associated with a fleet operator and/or a charging structure. The charging control signal can be determined, at least in part, from the current status indicators of the vehicle and/or its associated energy storage device (e.g., current location and/or current state of charge). The charging control signal also can be determined, at least in part, from one or more electric grid signals (e.g., time-based rate signals, demand response signals, frequency signals, etc.) indicating current status and/or power pricing information for an electric grid. The charging control signal also can be determined, at least in part, from one or more portions of service request data. In some examples, service request data can include a volume of current service requests that request operation of a vehicle for providing a service (e.g., a transportation service such as a rideshare service, courier service, delivery service, etc.) to one or more end users. In other examples, service request data can additionally or alternatively include predicted demand for services of the service provider (e.g., transportation, courier, delivery). Charging control signal generation based, at least in part, on multiple factors relative to the mobile energy storage fleet and/or electrical grid can provide a dynamically responsive energy solution that balances energy consumption needs of the fleet with supply/demand balance concerns encountered by the electric grid.

More particularly, charge controllers can control charging of energy storage devices in or otherwise associated with vehicles that are interfaced to an electrical energy infrastructure (e.g., electric grid) via one or more charging structures. The electric grid generally can include one or more generation portions, one or more transmission portions and one or more distribution portions. Generation portions of an electric grid can include one or more high capacity power generation sources (e.g., power plants such as coal plants, nuclear plants, hydro-electric plants, industrial power plants, etc.) and/or one or more low capacity power generation sources (e.g., solar farms, wind farms, smaller power plants, industrial or residential customers, etc.). The generation portions can be located in widely distributed locations that are connected by a nodal grid structure of transmission and distribution portions including step-up and step-down transformers that ultimately interface the generated power to industrial and/or residential energy consumers at urban or rural locations. Charging structures as disclosed herein can be coupled to distribution portions of the electrical grid at predetermined locations (e.g., in a clustered and/or distributed fashion) relative to this nodal grid structure. Charging control signals can effectively determine where a mobile fleet of vehicles with integrated energy storage devices and/or removable energy storage devices otherwise associated with a vehicle will be dynamically positioned relative to the predetermined locations of charging structures in order to operate as a consumer of grid power or a generator of grid power.

Vehicles interfaced to the electric grid via one or more charging structures as disclosed herein can include different types of powertrain systems that generally include at least one energy storage device located onboard the vehicle and configured to provide operating power for one or more vehicle systems. In some examples, one or more vehicles can correspond to a battery electric vehicle having a powertrain system with only battery power units provided as a form of onboard power. The battery power units can include, for example, a bank of one or more lithium ion batteries or other energy storage devices. In some examples, one or more vehicles can correspond to an extended range electric vehicle having a powertrain system that can include a primary battery power unit and an auxiliary non-battery power unit. An auxiliary non-battery power unit can correspond to an internal combustion engine (ICE), turbine engine, other engine, fuel cell, or other power unit coupled to an electric generator that charges the energy storage devices within the primary battery power unit. Although a primary battery power unit in an extended range electric vehicle can sometimes be powerful enough for full performance range of the vehicle, the auxiliary non-battery power unit can help to save cost on bank size of the energy storage devices and/or to maintain controlled limits on depletion thresholds for the energy storage devices. In some examples, one or more vehicles can correspond to a plug-in hybrid electric vehicle having a powertrain system that can include a primary non-battery power unit and an auxiliary battery power unit. The powertrain system of a plug-in hybrid electric vehicle can be predominantly operated by an ICE or other engine, but can be strengthened by a smaller electric motor during acceleration and other events and can include enough energy storage devices to provide some energy savings for vehicle operation. Additional vehicle powertrain system devices can include charge controllers, grid-tie inverters (e.g., bi-directional, anti-aliasing AC-DC-AC inverters), vehicle-to-grid (V2G) interface system, and the like.

In some examples, vehicles interfaced to the electric grid via one or more charging structures can correspond to autonomous vehicles. An autonomous vehicle can be configured to operate in one or more modes, for example, a fully autonomous operational mode, a semi-autonomous operational mode, a charging mode, a park/sleep mode, etc. A fully autonomous (e.g., self-driving) operational mode can be one in which the autonomous vehicle can provide driving and navigational operation with minimal and/or no interaction from a human driver present in the vehicle. A semi-autonomous (e.g., driver-assisted) operational mode can be one in which the autonomous vehicle operates with some interaction from a human driver present in the vehicle. Fully autonomous operational modes and semi-autonomous operational modes can both be considered service modes by which the autonomous vehicle can provide a vehicle service to end users. A charging mode can be used between operational modes while an autonomous vehicle is located at a charging structure for consuming power and/or generating power in accordance with a charge control signal. Park/sleep modes can be used between operational modes while a vehicle remains stationary or one or more systems of the autonomous vehicle are powered down.

An autonomous vehicle including charge control features as disclosed herein can include one or more operation systems configured to help maneuver and navigate the vehicle to specific charging structure locations at specific times and to control charging of energy storage devices in the vehicle powertrain system. In addition to a vehicle powertrain system, the operation systems of such an autonomous vehicle can include a computing system, a data acquisition system, an autonomy system, a communication system and/or a human-machine interface system. The computing system can include one or more processors and one or more memory devices storing instructions that when executed by the one or more processors cause the processors to perform the operations and functions disclosed herein, including but not limited to sensing current vehicle status indicators, autonomous vehicle navigation to selected charging structure locations, and/or controlled charging of vehicle energy storage devices in accordance with real-time charging control signals. The data acquisition system can include one or more image capture devices for detecting objects in the surrounding environment relative to the vehicle and one or more sensors (e.g., location sensors, motion sensors, GPS, telemetry position sensors, ambient temperature sensors, light sensors, etc.) for determining vehicle position relative to one or more other objects in the surrounding three-dimensional environment. The autonomy system can help control vehicle navigation functions (e.g., acceleration, deceleration, steering, routing, etc.) based on data acquired by the data acquisition system, map data, and/or other data. The communication system can include one or more devices for interfacing with one or more communication networks such that the vehicle computing device(s) can communicate with other computing device(s) onboard the vehicle or located remotely from the vehicle, such as located at a central control system associated with a fleet operator or a charging structure. The human-machine interface system can be configured to allow interaction between a user (e.g., a rider or other service customer, a charging structure operator, etc.) and the vehicle.

A central control system for controlling charge of a fleet of vehicles and/or associated energy storage devices can include one or more central computing devices configured to receive information signals from vehicle control systems, computing systems of end users requesting a vehicle service, and/or electric grid operation systems. Information signals from vehicle control systems can include a variety of current status indicators for a vehicle. In some examples, current status indicators can include a current geographic location for a vehicle as determined from one or more location sensors. In some examples, current status indicators can include a current state of charge of one or more energy storage devices located onboard the vehicle as determined by one or more charge sensors. Information signals from computing systems of end users requesting a vehicle service can include a variety of vehicle service request parameters. Vehicle service request parameters can include a requested date and/or time of service, a current location, pickup location, destination location, vehicle preferences, and other factors pertaining to a service request. Information signals from an electric grid operator can include one or more electric grid signals indicating current status and/or power pricing information for an electric grid. Electric grid signals can include time-based rate signals that provide power pricing rates for consuming energy during different increments of time. Electric grid signals can include demand response signals providing power pricing rates for increasing generation or supply and/or for reducing consumption or demand as needed to support operational requirements of a local electric grid. Electric grid signals can include frequency signals providing power pricing rates for short term voltage and frequency signal adjustments as needed to support operational requirements of a local electric grid.

Systems and methods for controlling charge of a fleet of vehicles can determine charging control signals for each vehicle in the fleet and/or for each energy storage device associated with such vehicles. Charging control signals can be determined locally at a vehicle control system or at a central control system associated with a fleet operator or charging structure. Each charging control signal can be determined, at least in part, from the one or more status indicators of the vehicles, the one or more electric grid signals and/or the one or more vehicle service request parameters. In some examples, a first plurality of vehicles in the fleet can be identified for operating in a service mode for providing a vehicle service to end users and a second plurality of vehicles in the fleet can be identified for operating in a charging mode. The charging control signals then can be provided to the entire fleet or to a subset of vehicles (e.g., the second plurality of vehicles) to control charging of the energy storage devices at the plurality of vehicles in accordance with the charging control signals. A central control system associated with a fleet operator and/or a charging structure can send command control signals to each vehicle in the fleet to assign vehicles between the first plurality of vehicles for operating in a service mode and the second plurality of vehicles for operating in a charging mode.

Charging control signals can include a variety of particular instructions provided in one or more configurations. In some examples, a charging control signal can include an instruction authorizing a vehicle and/or an energy storage device to start charging and/or an instruction for the vehicle and/or energy storage device to not charge. Instructions authorizing a vehicle and/or energy storage device to start charging can include an instruction to operate the vehicle in the charging mode as opposed to a service mode at a current time or at a future charging start time. Charging control signals instructing a vehicle not to charge can include an instruction to operate the vehicle in the service mode as opposed to the charging mode and/or an instruction not to charge at a current time but to wait until a future charging start time (e.g., when service demand for a fleet of service vehicles is low and/or power pricing rates are low). In some examples, a charging control signal can include one or more location instructions for identifying a location of a charging structure. In some examples, a charging control signal can include charging mode instructions for identifying a type of charging mode such as a positive charging mode or a negative charging mode. In some examples, a positive charging mode corresponds to a charging mode during which the charge level of an energy storage device increases, thus corresponding to consumption of power made available by the electric grid. In some examples, a negative charging mode corresponds to a charging mode during which the charge level of an energy storage device decreases, thus corresponding to generation of power by transferring energy from the energy storage device to the electric grid. In some examples, a charging control signal can include a start time and/or stop time for charging an energy storage device. In some examples, a charging control signal can include rate of charge instructions that specify a current rate of charge for charging an energy storage device. In some examples, a charging control signal can include target state of charge instructions that specify a target state of charge desired for the energy storage device. A target state of charge can be more than the current state of charge of an energy storage device if charging is desired in a positive charging mode. Alternatively, the target state of charge can be less than the current state of charge if charging is desired in a negative charging mode.

Charging structures can be provided at predetermined locations relative to a distribution network of an electric grid for selectively and systematically coordinating charging of vehicle energy storage devices in accordance with charging control signals. A charging structure can include a plurality of charging stations, an energy transfer system and a charge controller. Each charging station can be configured to receive a vehicle (e.g., by providing features for mechanically positioning the vehicle within the charging station) and register a vehicle (e.g., by providing features for communicatively coupling the vehicle and charging structure). The energy transfer system can interface with the energy storage device(s) provided in each vehicle and selectively charge the energy storage device(s). The charge controller can be coupled to the energy transfer system and configured to determine a current state of charge for each energy storage device and to control the charge of each energy storage device in accordance with one or more charging control signals. The charging control signals can be determined, at least in part, from the current state of charge of each energy storage device and one or more electric grid signals (e.g., time-based rate signals, demand response signals, frequency signals, etc.) indicating current status and/or power pricing information for an electric grid.

In some examples, a charging structure can include structural features designed to accommodate a plurality of vehicles in a mobile fleet. For instance, a charging structure can include one or more ingress access points and one or more egress access points. Charging control signals can instruct a vehicle to enter the charging structure at one or more ingress access points, navigate through the charging structure, and exit the charging structure at one or more egress access points upon attaining a target state of charge.

In some examples, the charging structure can include a plurality of vehicle platforms and/or internal tracks on which the vehicles may be maneuvered while in the charging structure. In some examples, the charging structure can include a plurality of fixed charging locations into which vehicles can be directed in accordance with charging control signals. In some examples, the charging structure can include one or more path bridges that provide a designated path through the charging structure by which a vehicle can exit the charging structure ahead of other vehicles upon reaching a target state of charge. A charging structure also can include additional features for implementing robotic cleaning and/or robotic maintenance and/or robotic fueling/charging of a vehicle after it is received and registered within a charging structure.

A charging structure can have one or more different configurations for the energy transfer system. In some examples, an energy transfer system can include one or more charge coupling devices provided at a plurality of charging stations within the charging structure, each charge coupling device configured to electrically couple to an energy storage device for a vehicle and charge or discharge the energy storage device. In some examples, an energy transfer system is a contactless charging system that can include one or more inductive charging coils positioned relative to an internal vehicle track on which the vehicles are selectively maneuvered through the charging structure. In some examples, an energy transfer system is a rim contact charging system that can include one or more conductive rails positioned relative to an internal vehicle track on which the vehicles are selectively maneuvered through the charging structure, wherein the conductive rail(s) are configured for electrical contact with vehicle rims and/or one or more other conductive vehicle devices configured to channel conducted charge to an energy storage device.

Charging structures can be provided in a variety of predetermined locations relative to a predetermined nodal grid structure of an electric grid. The predetermined locations can be selected based on one or more location factors including but not limited to proximity of the location to a predetermined node of an electric grid, location type and/or a footprint cost associated with the location. For example, a charging structure can be provided completely or partially as a floating structure with one or more portions provided on a waterway (e.g., river, canal, lake, etc.). In another example, a charging structure can be provided completely or partially as a high-rise structure with one or more levels provided within a dedicated or mixed-use high-rise structure. In another example, a charging structure can be provided completely or partially as an underground structure with one or more levels of a charging structure provided below ground level.

The systems and methods described herein may provide a number of technical effects and benefits. For instance, systems and methods for controlling charge of a fleet of vehicles can have a technical effect of addressing demand response needs within an electrical energy infrastructure (e.g., electric grid). Electric grids can sometimes experience supply concerns based on the fluctuating variability of power consumption and generation (e.g., hour-to-hour, day-to-day and/or season-to-season fluctuations). For instance, electric grids may experience peak consumption during specific times of day such as daylight hours, on specific days of the week, and/or during specific seasons of a year such as hot summer seasons or cold winter seasons. Supply concerns also can be encountered when power generation sources experience limitations (e.g., decreased energy at wind farms or solar farms due to weather-related phenomena). During expected or unexpected supply concerns, an electric grid can generate a demand response signal to grid consumers that provides power pricing rates indicative of financial incentives for extra generation or demand reduction as needed to support local grid demand. Charging control signals determined, at least in part, from demand response signals can provided targeted power generation and/or reduced consumption at strategically coordinated locations across an electric grid. Charge control features can be provided to increase, divert and/or reduce power in a beneficial manner, thus reducing the chance of overload and resulting power failure within an electric grid.

Systems and methods for controlling charge of a fleet of vehicles also can have a technical effect of regulating frequency within an electric grid. Frequency of power available on an electric grid is ideally set at a nominal value (e.g., 50 Hz in Europe and 60 Hz in the USA) and maintained as close as possible to this value everywhere on the grid. Differences between power supply and demand on the grid can result in fluctuations of a grid frequency from its nominal value. For example, grid frequency can decrease when power demand exceeds power generation, and grid frequency can increase if power generation is greater than the demand load. These frequency fluctuations can occur on a minute-by-minute and even second-by-second basis. Charging control signals determined, at least in part, from frequency signals indicating real-time increases and decreases encountered within an electric grid generally can provide an energy stability solution that helps regulate frequency, voltage or other energy parameters within the electric grid. Dynamic determination of locations, states of charge and rates of charging for energy storage devices in a vehicle fleet can be used to create a fast asset for frequency regulation because the response can be advantageously targeted in a controlled manner without overshooting frequency regulation correction goals.

The beneficial technical effects pertaining to alleviating supply concerns, responding to demand response signals with increased power generation and/or decreased consumption and/or regulating frequency can be advantageously enhanced using aspects of the disclosed embodiments since charging control features can be leveraged across an entire fleet of vehicles. The strategic implementation of charging control signals across a fleet of vehicles can harness a significant amount of energy in a given duty cycle (e.g., a day or portion of a day) in light of the amount of energy potentially drawn, stored and eventually expended by the entire fleet. This energy potential coupled with the relative ease of transferring electric energy stored as chemical energy in battery banks within vehicle powertrain systems (especially compared with transferring combustion fuels) can advantageously allow a fleet operator to serve multi-faceted roles as an energy consumer, grid power generator, frequency balancer and demand response service provider. By controlling operation of multiple vehicles as power consumers and/or power generators at configurable locations in accordance with charging control signals, power generation assets can be dynamically added and/or subtracted as needed within the electric grid.

Use of coordinated charging control for a fleet of vehicles can provide additional benefits for a fleet operator, including enhanced revenue generation. Fleet operators can control aspects of vehicle operation using control systems having customized algorithms and logic for determining and managing a state of charge for each vehicle in relation to vehicle service demand and potential grid services revenue. For example, vehicle service demand can be determined when end users request operation of a vehicle for providing a vehicle service to the end user (e.g., a transportation service such as a ride-share service, courier service, delivery service, etc.). Fleet operators can coordinate centralized control of vehicle navigation in a manner that enhances expected revenues obtained by providing the requested vehicle services at coordinated times and locations, including potentially peak operating dates/times for the vehicle service (e.g., during rush hour, during a special event). Fleet operators can balance vehicle service demands of end users with energy demands of an electric grid by determining charging control signals that are based, at least in part, from one or more electric grid signals (e.g., time-based rate signals, demand response signals, frequency signals, etc.), one or more vehicle service requests and/or one or more current status indicators of a vehicle. In some examples, revenue enhancement can be achieved by determining a first plurality of vehicles in the fleet for operating in a service mode and a second separate plurality of vehicles in the fleet for operating in a charging mode. Charging control signals can be coordinated by a fleet operator to earn service revenue as well as charging revenue in the form of power generation rebates or discounted cost of power consumption. This increased earning potential from multiple sources can provide substantial financial benefit for the fleet operator.

The systems and methods of the present disclosure also provide an improvement to vehicle computing technology, such as vehicle computing technology for controlling charge of energy storage devices located onboard a vehicle. For instance, the methods and systems enable one or more computing devices to provide enhanced control of vehicle charging without adding more complex, expensive charging hardware. For example, the systems and methods can determine one or more current status indicators (e.g., current location and current state of charge) for a vehicle, communicate the status indicators to a central control system located remotely from the vehicle, receive a charging control signal determined, at least in part, from the current location of the vehicle and the current state of charge of the energy storage device, and control charging of the energy storage device in accordance with the charging control signal. This can allow the vehicle computing systems to determine more relevant and useful charging parameters including charging location, charging mode, charging start and/or stop times, duration of charge, rate of charge, target state of charge and the like by leveraging the capability of the vehicle computing system. Moreover, the vehicle can save computational resources that may otherwise be used for the coordination of other vehicle charging measures. Accordingly, the saved processing and storage resources of the vehicle can be consumed for more critical, core functions of the vehicle such as vehicle operation in electric vehicles and/or imaging, object detection, navigation, etc. in autonomous vehicles.

With reference now to the FIGS., example embodiments of the present disclosure will be discussed in further detail. FIG. 1 depicts an example electrical energy infrastructure (e.g., electric grid) 100 including one or more generation portions, one or more transmission portions and one or more distribution portions. Generation portions of an electric grid 100 can include one or more high capacity power generation sources (e.g., power plants such as coal plants 110, nuclear plants 112, hydro-electric plants 114, industrial power plants 116, factories 118, medium sized power plants 120, etc.) and/or one or more low capacity power generation sources (e.g., solar farms 130, wind farms 132, smaller power plants 134, industrial customers 136, etc.). The generation portions can be located in widely distributed locations that are connected by a nodal grid structure of transmission and distribution portions including step-up and step-down transformers 140 that ultimately interface the generated power to industrial and/or residential energy consumers at urban or rural locations (e.g., farm 142 and residences 144).

Charging structures 150 as disclosed herein can be coupled to distribution portions of the electrical grid 100 at predetermined locations (e.g., in a clustered and/or distributed fashion) relative to this nodal grid structure. Charging control signals can effectively determine where a mobile fleet of vehicles 154 and their corresponding energy storage devices 155 will be dynamically positioned relative to the predetermined locations of charging structures 150 in order to operate as a consumer of grid power or a generator of grid power. Command control signals can be sent to vehicles 154 assigning vehicles 154 into either a first plurality of vehicles operating in a service mode or a second plurality of vehicles operating in a charging mode. Vehicles 154 in the second plurality of vehicles can be provided with charging control signals including more particular instructions identifying a particular charging structure 150 for charging an energy storage device associated with vehicle 154, or swapping a current energy storage device with a charged energy storage device provided at the charging structure 150. When charging control signals instruct a vehicle 154 and/or energy storage device 155 to interface with electric grid 100 at a charging structure 150 and operate in a positive charging mode, the charge level of an energy storage device 155 and/or an energy storage device associated with vehicle 154 increases, causing vehicle 154 and/or energy storage device 155 to operate as a consumer of grid power. When charging control signals instruct a vehicle 154 and/or energy storage device 155 to interface with electric grid 100 at a charging structure 150 and operate in a negative charging mode, the charge level of energy storage device 155 and/or an energy storage device associated with vehicle 154 decreases while charge is transferred to the electric grid 100, causing vehicle 154 and/or energy storage device 155 to operate as a generator of grid power. Charge control signals can include additional instructions to control charging of energy storage devices 155 in or otherwise associated with vehicles 154 that are interfaced to the electrical energy infrastructure (e.g., electric grid) 100 via one or more charging structures 150.

Charging structures 150 can be provided in a variety of predetermined locations relative to the predetermined nodal grid structure 138 of electric grid 100. The predetermined locations of charging structures 150 can be selected based on one or more location factors including but not limited to proximity of the location to a predetermined node of an electric grid, location type and/or a footprint cost associated with the location. For example, a charging structure 150 can be provided completely or partially as a floating structure with one or more portions provided on a waterway (e.g., river, canal, lake, etc.). In another example, a charging structure 150 can be provided completely or partially as a high-rise structure with one or more levels provided within a dedicated or mixed-use high-rise structure. In another example, a charging structure 150 can be provided completely or partially as an underground structure with one or more levels of a charging structure 150 provided below ground level. Additional description of features that may be provided within a charging structure 150 is presented with reference to FIGS. 7-9.

Figure 2:
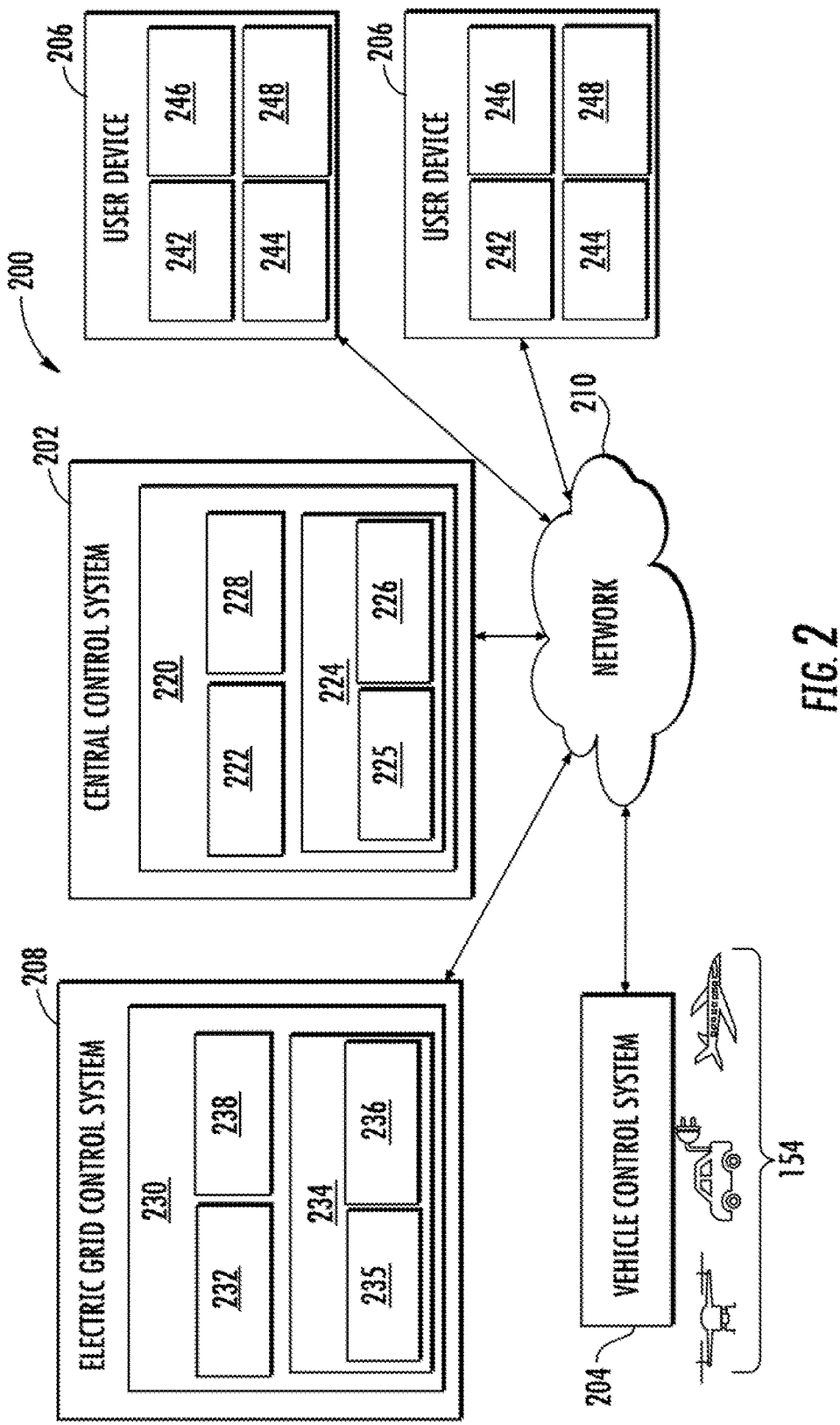
FIG. 2 depicts an example charge control system according to example embodiments of the present disclosure.

Referring now to FIG. 2, an example charge control system 200 according to example embodiments of the present disclosure includes a networked configuration of computing devices, including a central control system 202, a vehicle control system 204, one or more user device(s) 206, and an electric grid control system 208. The central control system 202, vehicle control system 204, user device(s) 206 and electric grid control system 208 can be configured to communicate via one or more network(s) 210. In some examples, the central control system 202 is associated with and/or operated by a fleet operator. A fleet operator can correspond to a service provider that provides a vehicle service to a plurality of end users via a fleet of vehicles 154. In some examples, central control system 202 is associated with and/or operated by an operator of a charging structure, such as an operator of charging structures 150 depicted in FIG. 1. Each vehicle 154 has an associated vehicle control system 204 provided locally at the vehicle 154. The vehicle control system 204 can include components for performing various operations and functions, for example, one or more computing device(s) onboard the vehicle 154. Additional aspects of vehicle control system 204 are discussed with reference to FIG. 6. Each user device 206 can be associated with and/or operated by an end user of the vehicle service coordinated by a fleet operator that manages central control system 202. Electric grid control system 208 can be associated with and/or operated by a stakeholder of an electric grid, such as an electric grid manager, energy provider, power pricing controller, etc.

The vehicle service(s) coordinated by central control system 202 can include one or more of a transportation service, a rideshare service, a courier service, a delivery service, and/or another type of service. The vehicle service(s) coordinated by central control system 202 can transport and/or deliver passengers as well as items such as but not limited to food, animals, freight, purchased goods, etc. The service(s) coordinated by central control system 202 can be provided by one or more vehicles 154. For example, vehicle 154 can be an automobile (conventional, autonomous, semi-autonomous, etc.), an aircraft, an unmanned aerial vehicle (e.g., UAV, UAS, drone, etc.) or another type of vehicle, each of which has an associated vehicle control system 204 provided locally at the vehicle 154. The vehicle 154 can be an autonomous vehicle that can drive, navigate, operate, etc. with minimal and/or no interaction from a human driver. The autonomous vehicle 154 can be configured to operate in one or more mode(s) such as, for example, a service mode, a charging mode, a park mode, a sleep mode, etc. Service modes can include, for example, a fully autonomous (e.g., self-driving) operational mode and/or a semi-autonomous operational mode. A fully autonomous operational mode can be one in which the autonomous vehicle 154 can provide driving and navigational operation with minimal and/or no interaction from a human driver present in the vehicle. A semi-autonomous operational mode can be one in which the autonomous vehicle 154 can operate with some interaction from a human driver present in the vehicle. A charging mode can be used between operational modes while an autonomous vehicle 154 is located at a charging structure for consuming power and/or generating power in accordance with a charge control signal. Park/sleep modes can be used between operational modes while a vehicle remains stationary or one or more systems of the autonomous vehicle are powered down.

The central control system 202 and the electric grid control system 208 can respectively include one or more computing device(s) 220/230. The computing device(s) 220/230 can include one or more processor(s) 222/232. The one or more processor(s) 222/232 can be any suitable processing device such as a microprocessor, microcontroller, integrated circuit, an application specific integrated circuit (ASIC), a digital signal processor (DSP), a field-programmable gate array (FPGA), logic device, one or more central processing units (CPUs), processing units performing other specialized calculations, etc. The processor(s) can be a single processor or a plurality of processors that are operatively and/or selectively connected.

The computing device(s) 220/230 also can include one or more memory device(s) 224/234. The memory device(s) 224/234 can include one or more non-transitory computer-readable storage media, such as RAM, ROM, EEPROM, EPROM, flash memory devices, magnetic disks, etc., and/or combinations thereof. The memory device(s) 224/234 can store information that can be accessed by the one or more processor(s) 222/232. For instance, the memory device(s) 224/234 can include computer-readable instructions 225/235 that can be executed by the one or more processor(s) 222/232. The instructions 225/235 can be software written in any suitable programming language or can be implemented in hardware. Additionally, and/or alternatively, the instructions 225/235 can be executed in logically and/or virtually separate threads on processor(s) 222/232. The instructions 225/235 can be any set of instructions that when executed by the one or more processor(s) 222/232 cause the one or more processor(s) 222/232 to perform operations.

For example, the memory device(s) 224/234 can store instructions that when executed by the one or more processor(s) 222/232 cause the one or more processor(s) 222/232 to perform operations such as the operations for controlling vehicle charging (e.g., one or more portion(s) of method 500), and/or any of the operations or functions of the control systems as described herein. The one or more memory device(s) 224/234 can store data 226/236 that can be retrieved, manipulated, created, and/or stored by the one or more processor(s) 222/232. The data 226 at central control system 202 can include, for instance, data received from vehicle control systems 204 (e.g., current status indicators including current location of vehicle 154, current state of charge of an energy storage device associated with vehicle 154, current operational status or mode of vehicle 154, etc.), data received from user devices 206 (e.g., vehicle service requests for receiving a vehicle service from a fleet operator), and/or data received from electric grid control system 208 (e.g., power pricing signals such as time-based rate data, demand response data and or frequency regulation data). Data 236 at electric grid control system can include, for instance, time-based rate data providing one or more power pricing rates for consuming energy during different increments of time, demand response data providing power pricing rates for increased generation or reduced consumption as needed to support local grid demand requirements, and/or frequency regulation data providing power pricing rates for short term frequency signal adjustment as needed to support local grid frequency requirements. The data 226/236 can be stored in one or more database(s). The one or more database(s) can be split up so that they are located in multiple locales.

The computing device(s) 220/230 also can include a communication interface 228/238 used to communicate with one or more other component(s) of the charge control system 200 (e.g., vehicle control system 204, user device(s) 206). The communication interfaces 228/238 can include any suitable components for interfacing with one or more network(s), including for example, transmitters, receivers, ports, controllers, antennas, or other suitable hardware and/or software.

The user device(s) 206 can be various types of computing devices. For example, the user device(s) 206 can include a phone, a smart phone, a tablet, a personal digital assistant (PDA), a laptop computer, a desktop computer, a computerized watch (e.g., a smart watch), computerized eyewear, computerized headwear, other types of wearable computing devices, a gaming system, a media player, an e-book reader, and/or other types of mobile and/or non-mobile computing devices.

The user device(s) 206 can include one or more input device(s) 242 and/or one or more output device(s) 244. The input device(s) 242 can include, for example, devices for receiving information from a user, such as a touch screen, touch pad, mouse, data entry keys, speakers, a microphone suitable for voice recognition, etc. The input device(s) 242 can be used, for example, by a user to request a vehicle service from a fleet operator. The output device(s) 244 can include devices for providing content to the user. For example, the output device(s) 244 can include a display device (e.g., display screen, CRT, LCD), which can include hardware for displaying a communication to a user. Additionally, and/or alternatively, the output device(s) 244 can include an audio output device (e.g., speaker) and/or device for providing haptic feedback (e.g., vibration).

The user device(s) 206 can include a positioning system 246 for determining and/or reporting a location of the user device 206. For example, the positioning system 246 can determine actual and/or relative position by using a satellite navigation positioning system (e.g. a GPS system, a Galileo positioning system, the Global Navigation Satellite System (GNSS), the BeiDou Satellite Navigation and Positioning system), an inertial navigation system, a dead reckoning system, based on IP address, by using triangulation and/or proximity to cellular towers or WiFi hotspots, beacons, and the like and/or other suitable techniques for determining position. As described herein, the user device(s) 206 can provide data indicative of device location (e.g., raw location reports) to the central control system 202 associated with a vehicle service provider.

The user device(s) 206 can include a communication interface 248 used to communicate with one or more other component(s) of the charge control system 200 (e.g., central control system 202, vehicle control system 204). The communication interface 248 can include any suitable components for interfacing with one or more network(s), including for example, transmitters, receivers, ports, controllers, antennas, or other suitable hardware and/or software.

The network(s) 210 can be any type of communications network, such as a local area network (e.g. intranet), wide area network (e.g. Internet), cellular network, any of the networks described herein, and/or or some combination thereof. The network(s) 210 also can include a direct connection between one or more components of the charge control system 200. In general, communication between one or more component(s) of the charge control system 200 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to control systems, computing devices, databases, software applications, and/or other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, control processes discussed herein can be implemented using a single computing device or multiple computing devices working in combination. Databases and applications can be implemented on a single system or distributed across multiple systems. Distributed components can operate sequentially or in parallel.

Furthermore, computing tasks discussed herein as being performed at computing device(s) remote from the vehicle (e.g., the central control system 202 and its associated computing device(s)) can instead be performed at the vehicle (e.g., via the vehicle control system 204). For example, the vehicle control system 204 can be configured to identify and communicate with a charging control structure 150 in the manner described herein, without communicating with the central control system 202. Likewise, computing tasks discussed herein as being performed at the vehicle (e.g., via the vehicle control system 204) can instead be performed by computing devices remote from the vehicle (e.g., the central control system 202 and its associated computing device(s)). Such configurations can be implemented without deviating from the scope of the present disclosure.

Figure 3:
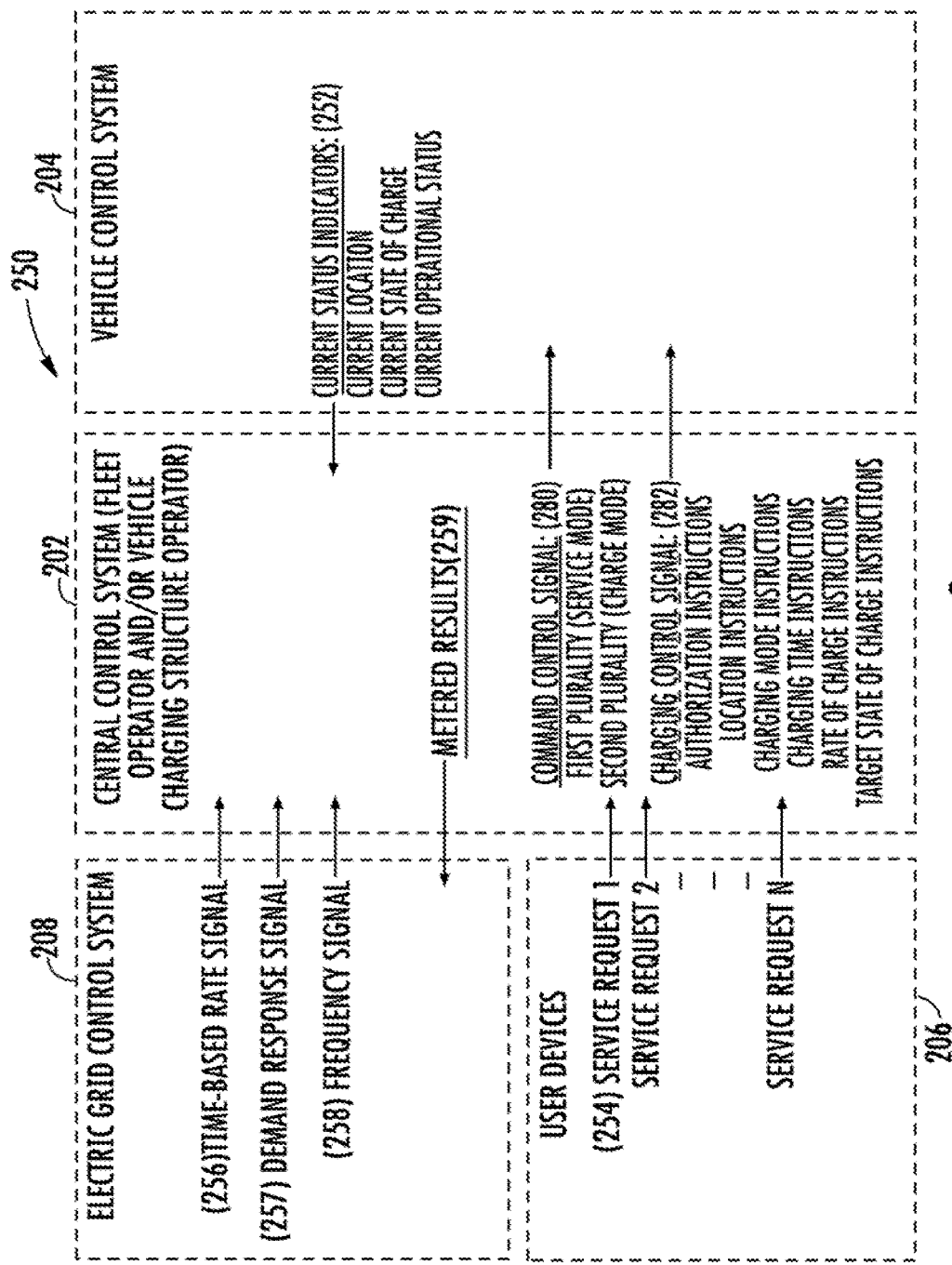
FIG. 3 depicts an example computer-implemented communication exchange within a charge control system according to example embodiments of the present disclosure.

Referring now to FIG. 3, an example computer-implemented communication exchange 250 within a charge control system (e.g., charge control system 200 of FIG. 2) includes exchange of signals or data among one or more central control systems 202, one or more vehicle control systems 204, one or more user devices 206 and one or more electric grid control systems 208. Information signals relayed to central control system 202 from vehicle control system 204 can include a variety of current status indicators 252 for a vehicle 154. In some examples, current status indicators 252 can include a current geographic location for a vehicle 154 as determined from one or more location sensors provided at the vehicle 154. In some examples, current status indicators 252 can include a current state of charge of one or more energy storage devices located onboard the vehicle 154 as determined by one or more charge sensors. In some examples, current status indicators 252 can include a current operational status (e.g., one of a plurality of modes such as a service mode or a charging mode to which the vehicle 154 is currently assigned).

Information signals relayed to central control system 202 from user devices 206 associated with end users requesting a vehicle service can be provided, for example, in the form of one or more vehicle service requests 254. Vehicle service requests 254 as depicted in FIG. 3 include Service Request 1, Service Request 2, etc. up to a total volume of N service requests. Determining a number N corresponding to a total volume of vehicle service requests within one or more geographic areas at a given point in time can be helpful for a central control system 202 to balance vehicle service demand against information from electric grid control system 208 in determining whether to assign vehicles to a service mode or a charging mode. Each vehicle service request 254 can include a variety of vehicle service request parameters. For example, vehicle service request parameters can include a requested date and/or time for the vehicle service, a current location associated with a user of user device 206, a pickup location for the vehicle service, a destination location for the vehicle service, vehicle preferences, and/or other factors pertaining to a vehicle service request 254.

Information signals relayed to or otherwise determined by central control system 202 can extend beyond current service requests as described above to predicted demand for services of the service provider. Demand can be predicted based on anticipated demand due to an upcoming event (e.g., sporting event or the like) and/or historical demand (e.g., by approximating the amount of requesters and/or the amount of autonomous vehicles at a particular geographic region at a certain time and/or date). In some examples, demand can be determined, at least in part, by considering a total volume of vehicle service requests within one or more geographic areas at a given point in time. The system can utilize various databases to predict, approximate, and/or determine the locations and/or amount of requesters, as well as the locations and amount of available service vehicles. For example, for different geographic regions, event information (e.g., location, time, and/or date of the event, or the like) can be stored in an event database. Event information can be indicative of whether service requests can be higher or lower at a certain time period (e.g., a time period before the event begins versus a time period when the event is ongoing), and can be indicative of whether there is a spike in demand for the service relative to the amount of available service vehicles. In another example, calendar information that indicates important dates (e.g., holidays, first days of school for a city, voting day, or the like), can be used to determine demand. Other examples of outside sources or other stored data (e.g., predicted future, current and/or historic events, conditions, or the like) include weather conditions, news information (e.g., fires, emergency situations, or the like), social information (e.g., via social networking websites), traffic conditions, flight information from airports and/or airlines, or the like, or other information that can assist in determining supply and/or demand for the service. In some implementations, predicted demand for services of the service provider can be analyzed in real-time or near real time to provide dynamically determined service request data for determining when to shift vehicles between a first plurality of vehicles operating in a service mode and a second plurality of vehicles operating in a charging mode. Based on such information, charging control signals can be determined that dynamically balance energy consumption needs of the fleet with historic, current and/or predicted service demand as well as supply/demand balance concerns encountered by the electric grid.

Information signals relayed to a central control system 202 from an electric grid control system 208 can include one or more electric grid signals indicating current status and/or power pricing information for an electric grid. Electric grid signals can include one or more time-based rate signals 256 that provide power pricing rates for consuming energy during different increments of time. Electric grid signals can include one or more demand response signals 257 providing power pricing rates for increasing generation or supply and/or for reducing consumption or demand as needed to support operational requirements of a local electric grid. Electric grid signals can include one or more frequency signals 258 providing power pricing rates for short term voltage and frequency signal adjustments as needed to support operational requirements of a local electric grid. In some examples, electric grid signals from electric grid control system (e.g., time-based rate signals 256, demand response signals 257 and/or frequency signals 258) can include contractual offers from an electric grid operator to perform one or more power services (e.g., power generation, power reduction, frequency regulation, etc.) in return for one or more incentives (e.g., a monetary reward, rebate, power cost reduction, etc.) A fleet operator or other entity associated with central control system 202 and/or associated charging structures can accept the contractual offers set forth in the electric grid signals, provide the contracted power services, and claim the agreed upon incentive(s). For example, a demand response signal 257 can include a contractual offer by an electric grid operator to reward an entity who fulfills a reduction in energy drawn from the electric grid and/or generates new energy to put into the electric grid. Verification that an entity has completed the contractually agreed upon power services can be based at least in part on a metered result 259, which can correspond to power levels measured and monitored by kilowatt meters associated with one or more vehicles and/or energy storage devices. Such metered result 259 can be relayed from a central control system 202 back to electric grid control system 208 to confirm a contracted amount of power service in order for a fleet operator or other entity associated with central control system 202 to claim the agreed upon incentive(s) from an electric grid operator.

Figure 4:
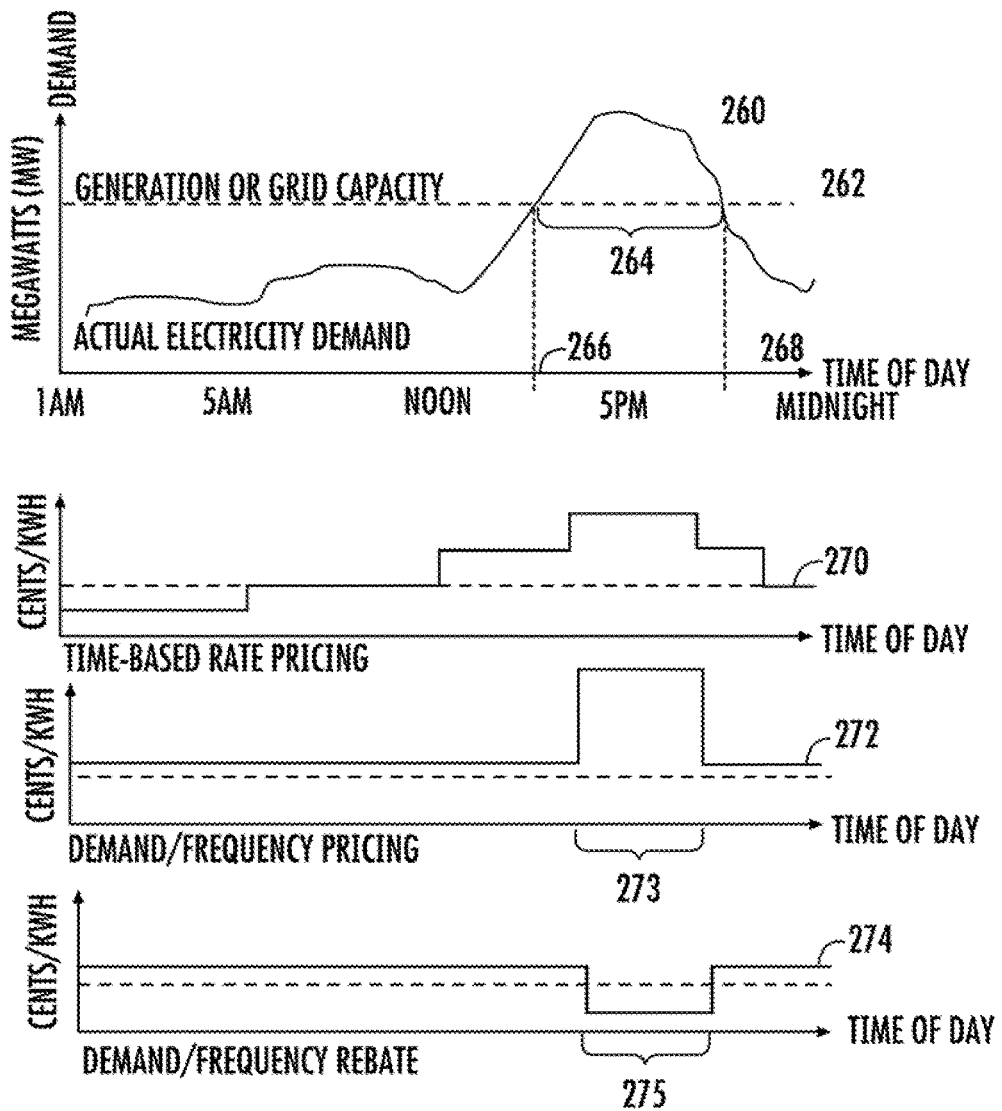
FIG. 4 depicts example electric grid signals including an energy demand signal, time-based rate pricing signal, demand/frequency pricing signal and demand/frequency rebate signal according to example embodiments of the present disclosure.

Examples of different electric grid signals relayed between an electric grid control system 208 and a central control system 202 are depicted in FIG. 4. Electricity demand signal 260 can be represented as a graphical depiction over time (e.g., during a 24-hour span of time in a single day) of actual electricity demand measured in units such as Megawatts (MW) for a given power provider or in a predetermined portion of a network corresponding to the electric grid. A capacity level 262 is plotted alongside the electricity demand signal 260 to indicate the generation capacity (e.g., grid capacity) of the given power provider or in a predetermined portion of a network corresponding to an electric grid 100. As depicted in the example of FIG. 4, there is a portion of time 264 between a first time 266 (about 3 PM) and a second time 268 (about 8 PM) when the actual electricity demand 260 exceeds the grid capacity 262. This portion of time 264 during which electricity demand 260 exceeds grid capacity 262 can be caused by any number of factors, including increased consumption during evening hours and/or due to operation in a particular season such as a hot summer or cold winter, decreased energy supply at wind farms and/or solar farms due to weather-related phenomena (e.g., low light or wind levels), or other hosts of issues.

Referring still to FIG. 4, the data contained in actual electricity demand signal 260 and grid capacity level 262 can be used, at least in part, to generate one or more subsequent signals including a time-based rate signal 270, a demand/frequency pricing signal 272 and/or a demand/frequency rebate signal 274. Time-based rate signal 270 includes different cost levels determined as cost per unit of energy (e.g., cents per kilowatt hour (KWH)) at different portions of time, each cost level being determined, at least in part, from the actual electricity demand during the different portions of time. Time-based rate signal 270 depicts four different power pricing rates charged by the power provider depending on the time of day and corresponding electricity demand. The highest power pricing rate in time-based rate signal 270 can be charged, for example, when the actual electricity demand is at its peak. In some examples, a time-based rate signal 270 can include a fewer or greater number of rates at different increments of time than depicted and/or can be generated in a continuous form as opposed to discrete steps that tracks actual electricity demand signal 260 in real time.

Demand/frequency pricing signal 272 can be a demand response signal or frequency signal that provides an indication of one or more increased power pricing rate levels available at one or more portions of time as determined from actual electricity demand signal 260. For example, demand/frequency pricing signal 272 indicates an increased price rate determined as cost per unit of energy (e.g., cents per kilowatt hour (KWH)) that an electricity generation entity could earn for generating a predetermined amount of power during portion of time 273. Demand/frequency rebate signal 274 can be a demand response signal or frequency signal that provides an indication of one or more decreased power pricing rate levels (e.g., rebates) available at one or more portions of time as determined from actual electricity demand signal 260. For example, demand/frequency rebate signal 274 indicates a decreased price rate determined as cost per unit of energy (e.g., cents per kilowatt hour (KWH)) that an electricity consumer could save for decreasing power consumption by a predetermined amount during portion of time 275.

Referring again to FIG. 3, one example of time-based rate signal 256 can correspond to time-based rate signal 270 of FIG. 4. One example of demand response signal 257 can correspond to one or more of demand/frequency pricing signal 272 and/or demand/frequency rebate signal 274 of FIG. 4. Frequency signal 258 also can be similar to one or more of demand demand/frequency pricing signal 272 and/or demand/frequency rebate signal 274 of FIG. 4, although it should be appreciated that the fluctuations in power pricing information in a frequency pricing or frequency rebate signal are often more variable with pricing values that change during relatively short increments of time, for example, on a minute-by-minute and/or second-by-second basis as frequency variations within the electric grid arise due to actively shifting generation levels and/or loads.

A time-based rate signal 256, demand response signal 257 and/or frequency signal 258, variations of such electric grid signals, portions of such electric grid signals and/or data extracted from the electric grid signals or variations or portions thereof can be relayed from an electric grid control system 208 to a central control system 202. The central control system 202 can analyze the power pricing information to determine one or more aspects of command control signals and/or charging control signals. One or more command control signals 280 and/or charging control signals 282 can be determined for each vehicle in a fleet operated by a vehicle service provider. Command control signals 280 and/or charging control signals 282 can be determined at a central control system 202 associated with a fleet operator or charging structure as depicted in FIG. 3 or locally at a vehicle control system 204. In some examples, the information from time-based rate signal 256, demand response signal 257 and/or frequency signal 258 is evaluated in real time relative to a volume of vehicle service requests received from end user devices 206 and/or relative to current status indicators 252 received from vehicle control systems 204 to determine one or more portions of a command control signal 280 and/or a charging control signal 282.

Command control signal 280 can include instructions indicating when to assign each vehicle to a first plurality of vehicles operating in a service mode or a second plurality of vehicles operating in a charging mode. Command control signals 280 can be dynamically determined in real time based, at least in part, on one or more of the one or more current status indicators 252 of the vehicles, the one or more electric grid signals (e.g., 256, 257, 258) and/or the one or more vehicle service requests 254 and associated vehicle service request parameters. In some examples, a first plurality of vehicles in the fleet can be identified in command control signal 280 for operating in a service mode for providing a vehicle service to end users and a second plurality of vehicles in the fleet can be identified in command control signal 280 for operating in a charging mode. Charging control signals 282 then can be provided to the entire fleet or to at least a subset of vehicles (e.g., the second plurality of vehicles) to control charging of the energy storage devices at the plurality of vehicles in accordance with the charging control signals 282. For example, considering a case when the price of electricity spikes, it may make sense for more vehicles to leave the service mode (e.g., the first plurality of vehicles) and be assigned to the second plurality of vehicles operating in a charging mode. When central control system 202 takes vehicles away from offering a vehicle service so that they can transfer energy to an electric grid, vehicles are effectively moved from the first plurality of vehicles (in a service mode) to the second plurality of vehicles (in a charging mode).

Charging control signal 282 can include instructions indicating one or more specific parameters configured to control aspects of charging energy storage devices in the second plurality of vehicles in accordance with the charging control signals. As such, charging control signals determined, at least in part, from one or more electric grid signals such as depicted in FIGS. 3 and 4 or otherwise can provide targeted power generation and/or reduced consumption at strategically coordinated locations across an electric grid. Charge control features can be provided to increase, divert and/or reduce power in a beneficial manner, thus reducing the chance of overload and resulting power failure within an electric grid.

Figure 5:
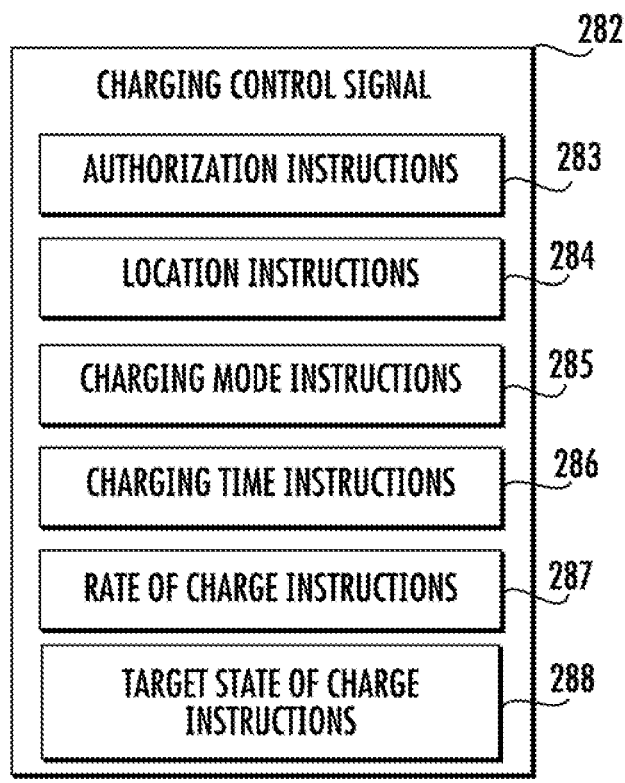
FIG. 5 depicts an example charging control signal according to example embodiments of the present disclosure.

More particular aspects of charging control signals 282 are depicted in FIG. 5, which can include a variety of particular instructions provided in one or more configurations. In some examples, a charging control signal 282 can include authorization instructions 283. Authorization instructions 283 can provide an instruction authorizing a vehicle to start charging and/or an instruction for the vehicle to not charge. When authorization instructions 283 include instructions authorizing a vehicle to start charging, authorization instructions 283 can include an instruction to operate the vehicle in a charging mode as opposed to a service mode at a current time and/or at a future charging start time. When authorization instructions 283 provide an instruction for the vehicle to not charge, authorization instructions 283 can include an instruction to operate the vehicle in the service mode as opposed to the charging mode and/or an instruction not to charge at a current time but to wait until a future charging start time (e.g., when service demand for a fleet of service vehicles is low and/or power pricing rates are low.) For example, if a vehicle 154 arrives at a charging structure 150 at 9 pm, service demand is low as represented by a relative low volume of vehicle service requests 254, and energy prices reflected by time-based rate signal 256 indicate that energy prices go down at 10 pm, it may make financial sense for the vehicle 154 to just wait until 10 pm to start charging an energy storage device.

Referring still to FIG. 5, a charging control signal 282 also can include location instructions 284. Location instructions 284 can include instructions for identifying a location of a charging structure 150 at which central control system 204 determines that a vehicle 154 should be directed such that an energy storage device associated with vehicle 154 can engage with energy transfer hardware to generate power (e.g., transfer energy to the grid from an energy storage device) or consume power (e.g., charge an energy storage device from grid power). In some examples, location instructions 284 can include a unique identifier for a charging structure that can be used to access a table or other database of information associated with all charging structures 150 in a nearby geographic area. In some examples, location instructions 284 can include a specific street address for a charging structure and/or particular geographic coordinates (e.g., latitude and longitude values) at which a charging structure is located. In some examples, location instructions 284 can identify charging structures at or near specific locations within an electric grid 100 that are in need of extra power generation during a portion of time as indicated in demand response and/or frequency signals received from an electric grid control system 208.

Location instructions 284 within charging control signal 282 can be determined based at least in part from one or more location factors. In some examples, location factors include data associated with current service requests and/or predicted demand for services of a service provider associated with a vehicle fleet. By controlling a vehicle to charge its energy storage devices in close proximity to locations where service demand is requested and/or predicted can enhance fleet performance and efficiency. For instance, predicted demand approximated or determined from event information, calendar information weather conditions, news information (e.g., fires, emergency situations, or the like), social information (e.g., via social networking websites), traffic conditions, flight information from airports and/or airlines, or the like, or other information can be used to control vehicles to be charged at charging structures that are geographically proximate to locations where service demand is predicted to be high at certain times or periods of time.

In some examples, location factors used at least in part to determine location instructions 284 within charging control signal can include data associated with electric grid signals. Electric grid signals indicating current status or power pricing information for an electric grid can include information identifying certain locations at which an energy provider or electric grid would benefit from additional power generation. For instance, electric grid signals can include specific requests to ease power loads at one or more specific nodes within an electric grid. In other examples, power pricing and/or grid fluctuation can vary between nearby locations at a given time of day. This type of fluctuation could happen, for instance, in geographic locations that are split across different power providers. For example, service vehicles operating around Kansas City could encounter different power prices and/or electric grid service fluctuation between portions of Kansas City located in the state of Missouri and portions of Kansas City located in the state of Kansas during certain times of the day. By controlling a vehicle to charge its energy storage devices in close proximity to locations where electric grid signals indicate a need for extra power generation, a fleet operator can advantageously assist energy providers while simultaneously enhancing revenue benefits available from providing power generation to the electric grid.

Charging control signal 282 also can include charging mode instructions 285 for identifying a type of charging mode such as a positive charging mode or a negative charging mode. In some examples, a positive charging mode corresponds to a charging mode during which the charge level of an energy storage device increases, thus corresponding to consumption of power made available by the electric grid. In some examples, a negative charging mode corresponds to a charging mode during which the charge level of an energy storage device decreases, thus corresponding to generation of power by transferring energy from the energy storage device to the electric grid.

Referring still to FIG. 5, in some examples, a charging control signal 282 can include charging time instructions 286 indicating a start time and/or stop time for charging an energy storage device. In some examples, a charging control signal 282 can include rate of charge instructions 287 that specify a current rate of charge for charging an energy storage device. Slower rates of charge may be used, for example, during times of day when energy demand is high and/or a volume of vehicle service requests are low. Higher rates of charge may be used, for example, during times of day when a volume of service requests are high and a vehicle that needs to recharge its energy storage device(s) would like to quickly transition from a charging mode to a service mode. In some examples, a charging control signal 282 can include target state of charge instructions 288 that specify a target state of charge desired for one or more energy storage devices within a vehicle 154. A target state of charge can be more than the current state of charge of an energy storage device if charging is desired in a positive charging mode. Conversely, the target state of charge can be less than the current state of charge if charging is desired in a negative charging mode.

Figure 6:
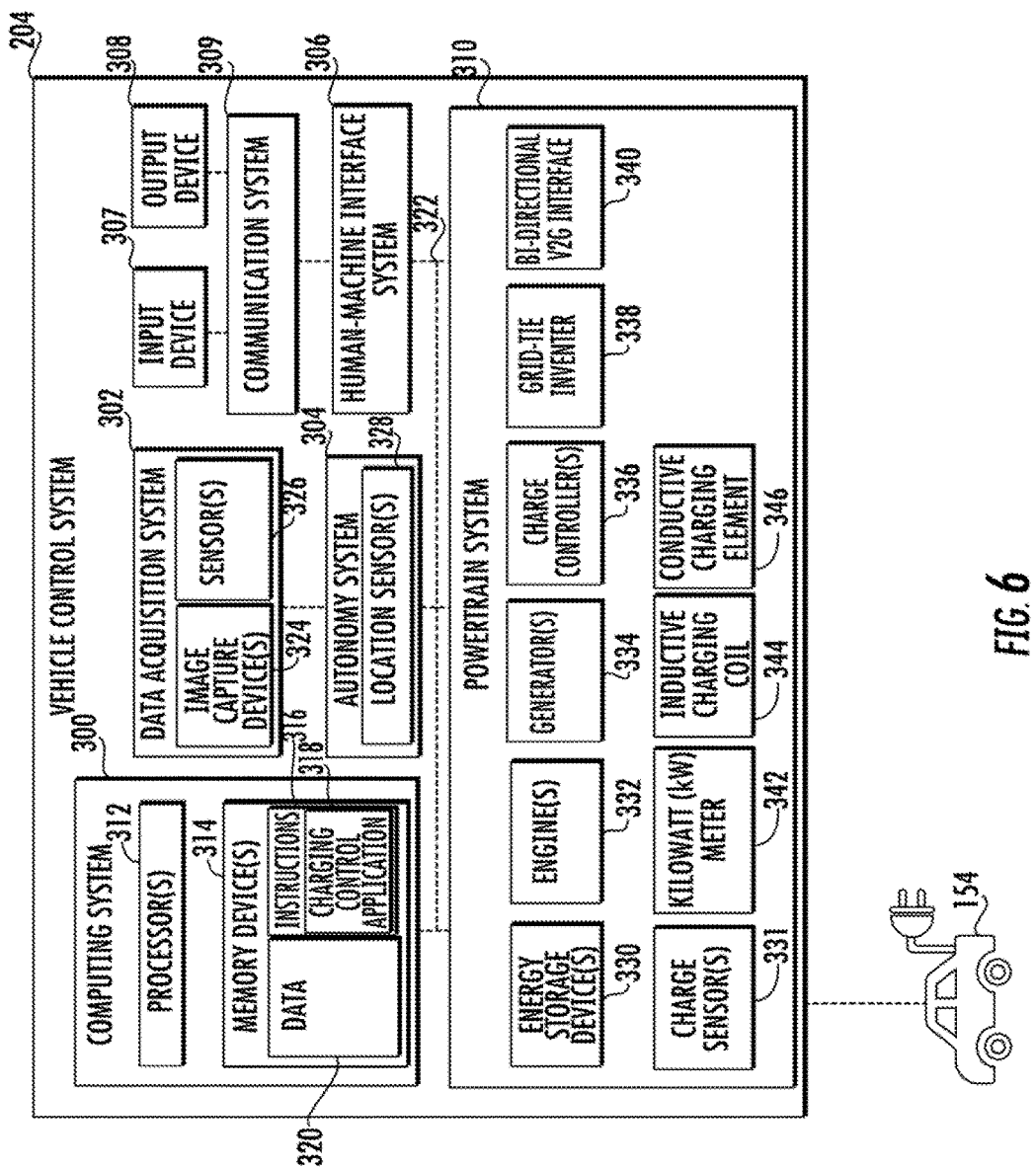
FIG. 6 depicts an example vehicle control system including a charging control application and associated systems according to example embodiments of the present disclosure.

Referring now to FIG. 6, a vehicle control system 204 can include a plurality of vehicle systems including one or more computing systems 300, one or more data acquisition systems 302, an autonomy system 304, a human-machine interface system 306, a communication system 309 and a powertrain system 310. The vehicle computing system 300 can include multiple components for performing various operations and functions. For example, the vehicle computing system 300 can include one or more computing device(s) onboard a vehicle 154. The vehicle computing system 300 can include one or more processor(s) 312 and one or more memory device(s) 314, each of which can be physically located onboard the vehicle 154. The one or more processor(s) 312 can have similar features as described with reference to processor(s) 222/232 of FIG. 2. The one or more memory device(s) 314 can have similar features as described with reference to memory devices 224/234 of FIG. 2. The one or more memory device(s) 314 can store instructions 316 that when executed by the one or more processor(s) 312 cause the one or more processor(s) 312 to perform the operations and functions of the vehicle 154, as described herein. One particular set of instructions 316 can include a charging control application 318, which corresponds to an application for implementing specific instructions set forth in a charging control signal 282 relayed to a vehicle 154 from a central command system 202. The one or more memory device(s) 314 also can store data 320 that can be retrieved, manipulated, created, and/or stored by the one or more processor(s) 312. The data 320 can include, for instance, current status indicators 252 of a vehicle 154 including current location of vehicle 154, current state of charge of an energy storage device associated with vehicle 154, current status or mode of vehicle 154, etc.).

The vehicle computing system 300 can include and/or communicate with various other systems associated with the vehicle 154. For instance, the vehicle control system 204 can include one or more data acquisition systems 302, an autonomy system 304, a human-machine interface system 306, one or more input devices 307, one or more output devices 308, a communications system 309, a powertrain system 310 and/or other vehicle systems. The other vehicle systems can be configured to control and/or monitor various other aspects of the vehicle 154. Such other vehicle systems can include, for example, an onboard diagnostics systems, engine control unit, transmission control unit, memory devices, etc. The systems of the vehicle 154 can be configured to communicate via a network 322. The network 322 can include one or more data bus(es) (e.g., controller area network (CAN)), an onboard diagnostics connector (e.g., OBD-II), and/or a combination of wired and/or wireless communication links. The systems can send and/or receive data, messages, signals, etc. amongst one another via the network 322.

The data acquisition system(s) 302 can include various devices configured to acquire data associated with the vehicle 154. This can include data associated with one or more of the vehicle's systems, the vehicle's interior, the vehicle's exterior, the vehicle's surroundings, the vehicle users, etc. The data acquisition system(s) 302 can include, for example, one or more image capture device(s) 324. The image capture device(s) 324 can include one or more camera(s), light detection and ranging (or radar) device(s) (LIDAR systems), two-dimensional image capture devices, three-dimensional image capture devices, static image capture devices, dynamic (e.g., rotating, revolving) image capture devices, video capture devices (e.g., video recorders), lane detectors, scanners, optical readers, electric eyes, and/or other suitable types of image capture devices. The image capture device(s) 324 can be located in the interior and/or on the exterior of the vehicle 154. The image capture device(s) 324 can be configured to acquire image data to allow the vehicle 154 to implement one or more machine vision techniques (e.g., to detect objects in the surrounding environment). For example, the image capture device(s) 324 can be used to help detect nearby vehicles, bicycles, pedestrians, buildings, signage, etc. during operation of the vehicle 154.

The data acquisition systems 302 can include one or more sensor(s) 326. The sensor(s) 326 can include motion sensors, pressure sensors, temperature sensors, humidity sensors, RADAR, sonar, radios, medium-range and long-range sensors (e.g., for obtaining information associated with the vehicle's surroundings), global positioning system (GPS) equipment, proximity sensors, and/or any other types of sensors for obtaining data associated with the vehicle 154 and/or relevant to the operation of the vehicle 154 (e.g., in an autonomous mode). The data acquired by the sensor(s) 326 can help detect other vehicles and/or objects, road conditions (e.g., curves, potholes, dips, bumps, changes in grade), measure a distance between the vehicle 154 and other vehicles and/or objects, etc. The sensor(s) 326 can include sensor(s) associated with one or more mechanical and/or electrical components of the vehicle.

The vehicle control system 204 also can be configured to obtain location data. For instance, autonomy system 304 can include one or more location sensors 328 for determining and/or reporting a location of the vehicle 154. For example, the location sensor(s) 328 can determine actual and/or relative position by using a satellite navigation positioning system (e.g. a GPS system, a Galileo positioning system, the Global Navigation Satellite System (GNSS), the BeiDou Satellite Navigation and Positioning system), an inertial navigation system, a dead reckoning system, based on IP address, by using triangulation and/or proximity to cellular towers or WiFi hotspots, beacons, and the like and/or other suitable techniques for determining position. As described herein, the vehicle control system 204 can provide data indicative of vehicle location (e.g., raw location reports) to the central control system 202 associated with a vehicle service provider.

The vehicle control system 204 also can be configured to obtain map data. For instance, a computing device of the vehicle 154 (e.g., within the autonomy system 304) can be configured to receive map data from one or more remote computing system(s) (e.g., associated with a geographic mapping service provider) and/or local memory device(s). The map data can include two-dimensional and/or three-dimensional geographic map data associated with the area in which the vehicle 154 was, is, and/or will be travelling. The autonomy system 304 can be configured to allow the vehicle 154 to operate in an autonomous mode (e.g., fully autonomous mode, semi-autonomous mode). For instance, the autonomy system 304 can obtain the data associated with the vehicle 154 (e.g., acquired by the data acquisition system(s) 302). The autonomy system 304 also can obtain the map data. The autonomy system 304 can control various functions of the vehicle 154 based, at least in part, on the data acquired by the data acquisition system(s) 302 and/or the map data to implement an autonomous mode. For example, the autonomy system 304 can include various models to perceive elements (e.g., road features, signage, objects, people, buildings, animals, etc.) based, at least in part, on the acquired data and/or map data. In some implementations, the autonomy system 304 can include machine-learned models that use the data acquired by the data acquisition system(s) 302 and/or the map data to help operate the vehicle.

The data acquired by the data acquisition system(s) 302 and/or the map data can be used within the various models to, for example, detect other vehicles and/or objects, detect road conditions (e.g., curves, potholes, dips, bumps, changes in grade), measure a distance between the vehicle 154 and other vehicles and/or objects, etc. The autonomy system 304 can be configured to predict the position and/or movement (or lack thereof) of such elements (e.g., using one or more odometry techniques). The autonomy system 304 can be configured to plan the motion of the vehicle 154 based, at least in part, on such predictions. The autonomy system 304 can include a navigation system and can be configured to implement the planned motion to appropriately navigate the vehicle 154 with minimal and/or no human-driver intervention. For example, the autonomy system 304 can regulate vehicle speed, acceleration, deceleration, steering, and/or the operation of components to follow the planed motion. In this way, the autonomy system 304 can allow an autonomous vehicle 154 to operate in a fully and/or semi-autonomous mode. Autonomy system 304 can also control one or more vehicle navigation functions for maneuvering the vehicle 154 to a charging location for the vehicle (e.g., a location of one or more charging structures 150) specified in the location instructions 284 of a charging control signal 282.

The human machine interface system(s) 306 can be configured to allow interaction between a user (e.g., human) and the vehicle 154 (e.g., the vehicle computing system 300). The human machine interface system(s) 306 can include a variety of interfaces for the user to input and/or receive information from the vehicle computing system 300. For example, the human machine interface system(s) 306 can include a graphic user interface, direct manipulation interface, web-based user interface, touch user interface, attentive user interface, conversational and/or voice interfaces (e.g., via text messages, chatter robot), conversational interface agent, interactive voice response (IVR) system, gesture interface, holographic user interface, intelligent user interface (e.g., acting on models of the user), motion tracking interface, non-command user interface, OOUI, reflexive user interface, search interface, tangible user interface, task focused interface, text based interface, natural language interfaces, command line interface, zero-input interfaces, zooming user interfaces, and/or other types of interfaces. In some implementations, the human machine interface system(s) 306 can be implemented using the one or more output device(s) 308 (e.g., display devices, speakers, lights) to output data associated with the interfaces. The human machine interface system(s) 306 also can interact with one or more input device(s) 307 (e.g., touchscreens, keypad, touchpad, knobs, buttons, sliders, switches, mouse, gyroscope, microphone, other hardware interfaces) configured to allow the user to provide input.

The communications system 309 can be configured to allow the vehicle systems to communicate with other computing devices. The vehicle computing system 300 can use the communications system 309 to communicate with the central control system 202 over a network (e.g., via one or more wireless signal connections). In some implementations, the vehicle computing system 300 can use the communications system 309 to communicate with one or more user device(s) 206. In some implementations, the communications system 309 can be configured to allow the vehicle control system 204 to communicate with one or more onboard systems of the vehicle 154. The communications system 309 can include any suitable components for interfacing with one or more network(s), including for example, transmitters, receivers, ports, controllers, antennas, or other suitable components that can help facilitate communication with one or more other computing device(s) (e.g., computing device(s) within central control system 202, end user devices 206, and/or electric grid operator control system 208).

The vehicle powertrain system 310 can include at least one energy storage device 330 located onboard the vehicle 154 and configured to provide operating power for one or more vehicle systems and/or one or more devices provided within or associated with one or more vehicle systems. The energy storage device(s) 330 can include, for example, a bank of one or more lithium ion batteries or other energy storage devices. One or more charge sensor(s) 331 can be provided to determine a current state of charge of the energy storage device(s) 330 located within powertrain system 310. In some examples, one or more vehicles 154 including an energy storage device 330 can correspond to a battery electric vehicle having a powertrain system 310 with only battery power units provided as a form of onboard power. In some examples, one or more vehicles 154 can correspond to an extended range electric vehicle having a powertrain system 310 that can include a primary battery power unit and an auxiliary non-battery power unit. An auxiliary non-battery power unit can correspond to an engine 332 (e.g., an internal combustion engine (ICE), turbine engine, other engine, fuel cell, or other power unit). When powertrain system 310 does include an engine 332, engine 332 can be coupled to an electric generator 334 that charges the energy storage device(s) 330 within the primary battery power unit. Although a primary battery power unit in an extended range electric vehicle can sometimes be powerful enough for full performance range of the vehicle, the auxiliary non-battery power unit can help to save cost on bank size of the energy storage device(s) 330 and/or to maintain controlled limits on depletion thresholds for the energy storage device(s) 330. In some examples, one or more vehicles 154 can correspond to a plug-in hybrid electric vehicle having a powertrain system 310 that can include a primary non-battery power unit and an auxiliary battery power unit. The powertrain system 310 of a plug-in hybrid electric vehicle can be predominantly operated by an ICE or other engine 332, but can be strengthened by a smaller electric motor during acceleration and other events and can include enough energy storage device(s) 330 to provide some energy savings for vehicle operation.

Vehicle powertrain system 310 also can include additional system components, including but not limited to a charge controller 336, one or more grid-tie inverters 338, and bi-directional vehicle-to-grid (V2G) interface system 340. Charge controller(s) 336 can include hardware and/or software interface components (e.g., an insulated-gate bipolar transistor) for coupling to the energy storage device(s) 330 and one or more controllable computing device(s) configured to execute the instructions provided within a charging control signal 282. Grid-tie inverter 338 can include one or more power inverters configured to convert direct current (DC) electricity into alternating current (AC) electricity. Grid-tie inverter 338 can be configured to synchronize electricity stored within energy storage device 330 with electricity provided at a connection point to electric grid 100. One non-limiting example of a grid-tie inverter 338 includes a bi-directional, anti-aliasing AC-DC-AC inverter. V2G Interface system 340 can include one or more hardware and/or software components that facilitate bi-directional power flow capability for energy storage device(s) 330. V2G interface system 340 can enable fast charging of energy storage device(s) 330 in both a positive charging mode during which the charge level of the energy storage device(s) 330 increases and/or a negative charging mode during which the charge level of the energy storage device(s) 330 decreases. Killowatt (kW) meter 342 can be configured to monitor energy transfer to and from the energy storage device(s) 330 associated with a vehicle 154. Killowatt meter 342 can measure and monitor in kilowatt-hours (kWh) or other defined parameters the bi-directional quantities of energy flow indicative of consumption of power by the energy storage device(s) 330 and/or the generation of power from the energy storage device(s) 330 to the electric grid. The amounts of power measured and monitored by kilowatt meter 342 can be used to measure and verify one or more performance factors associated with the disclosed systems and methods for controlling charge of a mobile energy storage fleet relative to an electric grid, as is further described in the method of FIG. 14. One or more inductive charging coils 344 can be provided for wireless/contactless transfer of power between energy storage device(s) 330 and coupled inductive charging coils associated with an energy transfer system. One or more conductive charging elements 346 can be provided for transfer of power between energy storage device(s) 330 and coupled conductive rails or other dedicated conductive charging element provided at an energy transfer system, charging structure or other charge controller system.

It should be appreciated that one or more components of vehicle powertrain system 310 can be located on-board vehicle 154, while one or more other components of vehicle powertrain system 310 can be located off-board the vehicle. For example, charge controller 336 and/or grid-tie inverter 338 can be located off-board the vehicle and coupled to an energy storage device 330 when needed or desired. In some instances, charge controller 336 can be directly coupled with grid-tie inverter 368 from a functional standpoint. For example, an insulated-gate bibolar transistor (IGBT) provided within charge controller 336 can be configured to draw AC current (e.g., grid energy) and convert it into one or more precise DC voltages needed to push energy into the energy storage device(s) 330 at a given rate. An IGBT within charge controller 336 can also be configured to function as an inverter and draw DC current from energy storage device(s) 330, and invert the energy into one or more AC voltages that match the voltage and frequency levels of an associated electric grid.

Referring now to FIGS. 7-10, more particular aspects of example charging structures 150 are variously represented. Charging structures 150 can be provided at predetermined locations relative to a distribution network of an electric grid 100 for selectively and systematically coordinating charging of energy storage devices 330 in accordance with charging control signals 282. A charging structure 150 generally can include one or more charging stations, an energy transfer system and a charge controller.

Figure 7:
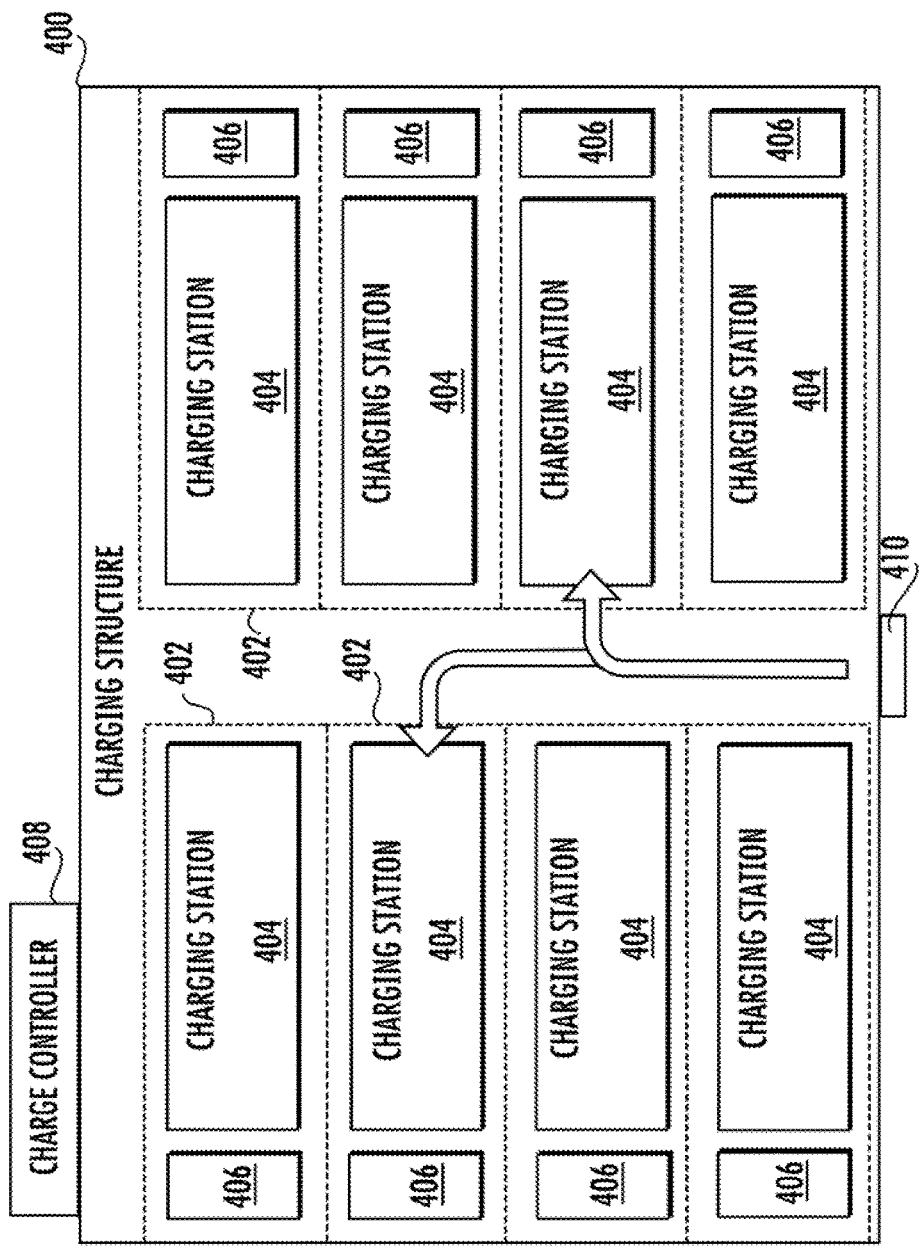
FIG. 7 depicts a first example charging structure embodiment according to example embodiments of the present disclosure.

For example, charging structure 400 of FIG. 7 includes a plurality of predetermined physical locations 402 within a given geographic area. It should be appreciated that although charging structure 400 of FIG. 7 includes a fixed number (namely, eight (8)) predetermined physical locations 402, any number of physical locations 402 within charging structure 400 is possible, including only a single physical location 402 or many more physical locations 402 in one or more groups, on one or more levels of a multi-level structure, or the like. Each physical location 402 can include a charging station 404 and an energy transfer system 406. In some examples, charging stations 404 can correspond to vehicle charging stations configured to receive a vehicle 154 (e.g., by providing features for mechanically positioning the vehicle 154 within the charging station 404) and register a vehicle 154 (e.g., by providing features for communicatively coupling the vehicle 154 and charging structure 400). In some examples, the mechanical features for positioning a vehicle 154 within charging station 404 include a platform. In some examples, charging stations 404 can correspond to battery charging stations for an energy storage device that is removable from a vehicle.

Each energy transfer system 406 can interface with an energy storage device(s) 330 provided in or otherwise associated with each vehicle 154 and selectively charge the energy storage device(s) 330. The charge controller 408 can be coupled to each energy transfer system 406 and configured to determine a current state of charge for each energy storage device 330 for vehicles 154 received and registered within charging station(s) 404. Charge controller 408 can control the charge of each energy storage device 330 in accordance with one or more charging control signals 282. In some examples, charge controller 408 can include a central control system 202 as described in FIG. 6. One or more ingress/egress access points 410 also can be provided at charging structure 400 through which vehicles 154 can be navigated in an autonomous and/or semi-autonomous operational mode towards one or more of the charging stations 404.

The particular configuration of each energy transfer system 406 within charging structure 400 of FIG. 7 can vary. In some examples, energy transfer system 406 can include one or more charge coupling devices provided at each charging station 404 within the charging structure 400. Each charge coupling device within energy transfer system 406 can be configured to electrically couple to an energy storage device 330 within a vehicle 154 and charge or discharge the energy storage device. Electrical coupling can occur, for example, by providing an electrical receptacle within each energy transfer system 406 that can be electrically engaged by an electrical plug provided as an integral part of each vehicle 154, the electrical plug being in turn electrically coupled to an energy storage device 330 within vehicle 154. In some examples, each energy transfer system 406 is a contactless charging system that can include one or more inductive charging coils positioned relative to mechanical features provided within charging station 404 for receiving a vehicle 154. Inductive charging coils within transfer system 406 can be configured to couple to inductive charging coils in vehicle 154 or otherwise associated with an energy storage device 330. In some examples, each energy transfer system 406 includes a conductive charging system that includes a first conductive charging element (e.g., one or more conductive rails, vehicle positioning elements, or other mechanical features provided within charging station 404 for receiving vehicle 154). The first conductive charging element can be configured for electrical contact with a second conductive charging element associated with a vehicle 154 or energy storage device 330 to form a channel for transferring conducted charge to/from an energy storage device 330.

Figure 8:
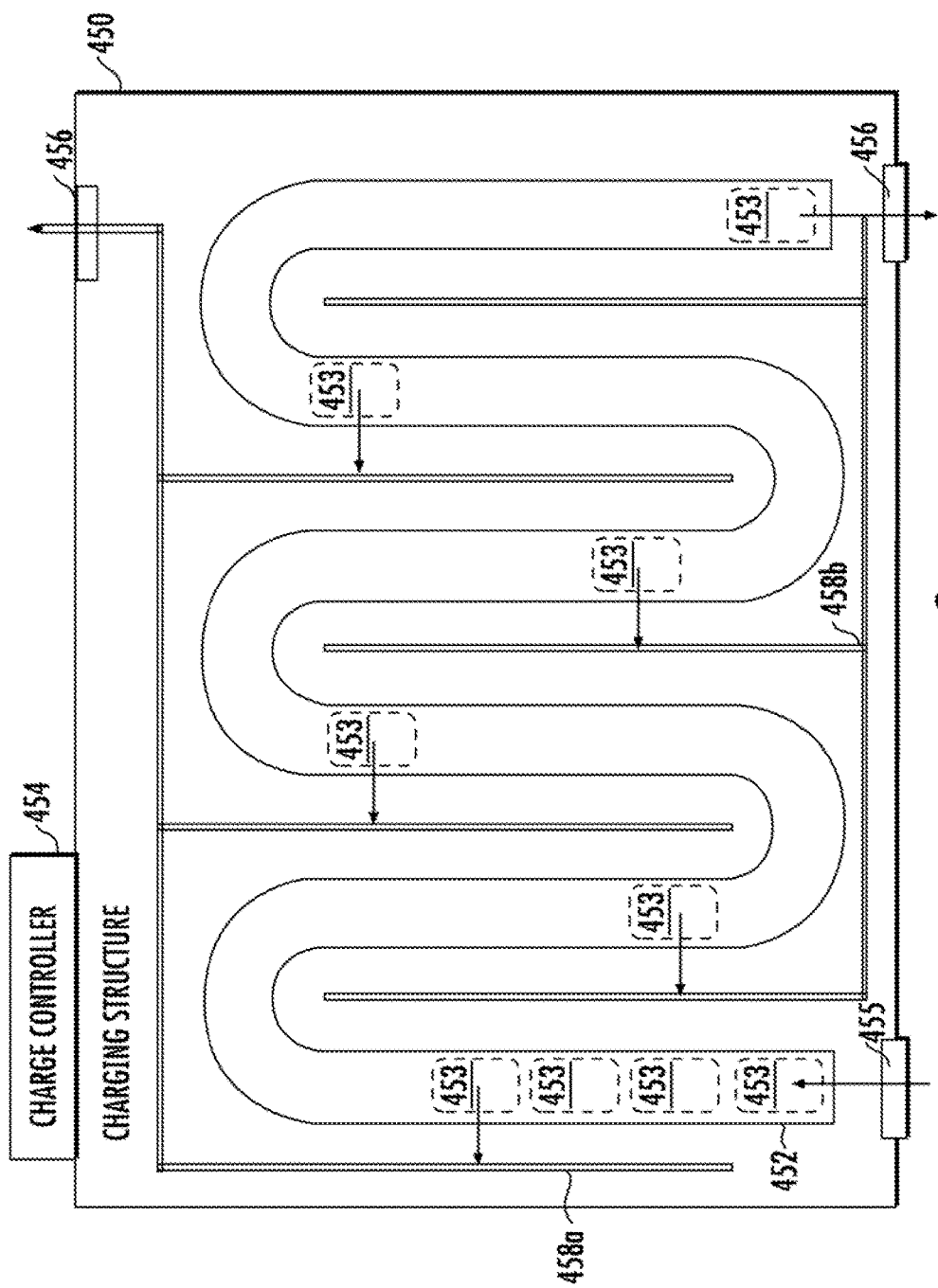
FIG. 8 depicts a second example charging structure embodiment according to example embodiments of the present disclosure.

FIG. 8 depicts a second exemplary charging structure 450. Charging structure 450 can include a vehicle track 452 along which vehicles 154 can be selectively maneuvered through the charging structure 450. Vehicle track 452 can include a plurality of charging stations 453 provided in predetermined locations along vehicle track 452. It should be appreciated that FIG. 8 depicts only a subset of charging stations 453 along vehicle track 452, although charging stations 453 can be provided along the entire portion of vehicle track 452. Each charging station 453 can be configured to receive a vehicle 154 (e.g., by providing features for mechanically positioning the vehicle 154 within the charging station 450) and register a vehicle 154 (e.g., by providing features for communicatively coupling the vehicle 154 and charging structure 450). Vehicle track 452 and/or the plurality of charging stations 453 can include one or more energy transfer systems, such as energy transfer system 406 of FIG. 7, which can include contact charging features and/or contactless charging features. For example, an energy transfer system associated with vehicle track 452 can be a contact charging system that can include one or more conductive charging elements positioned relative to vehicle track 452 on which the vehicles 154 are selectively maneuvered through the charging station 450. The conductive charging element(s) can be configured for electrical contact with vehicle rims and/or one or more other conductive charging elements associated with a vehicle 154 or energy storage device 330 and configured to channel conducted charge to energy storage device 330. Other charging systems within charging structure 154 can include one or more inductive charging coils and/or hardwired charging receptacles for receiving vehicle plugs as previously described. A charge controller 454 can control the charge of each energy storage device 330 in accordance with one or more charging control signals 282. In some examples, charge controller 454 can include a central control system 202 as described in FIG. 6.

Charging structure 450 can include one or more ingress access points 455 and one or more egress access points 456. Charging control signals 282 can instruct a vehicle to enter the charging structure 450 at one or more ingress access points 454, navigate through the charging structure 450, and exit the charging structure 450 at one or more egress access points 456 upon attaining a target state of charge, receiving a signal to shift into a service mode, etc. In some examples, each charging station 453 can include a vehicle platform for receiving a vehicle 154 and maneuvering it along vehicle track 452. Charging structure 450 also can include one or more path bridges 458a/458b that provide a designated path through the charging structure 450 by which a vehicle 154 can be controlled from vehicle track 452 to exit the charging structure 450 via the one or more path bridges 458a/458b ahead of other vehicles positioned on vehicle track 452. Vehicles 154 can be controlled towards a path bridge 458a/458b from vehicle track 452 when, for example, vehicle 154 reaches a target state of charge, receives a command control signal to transition from a second plurality of vehicles in a charging mode to a first plurality of vehicles in a service mode, or is otherwise instructed to do so by a charge controller 454 or other control system.

Figure 9:
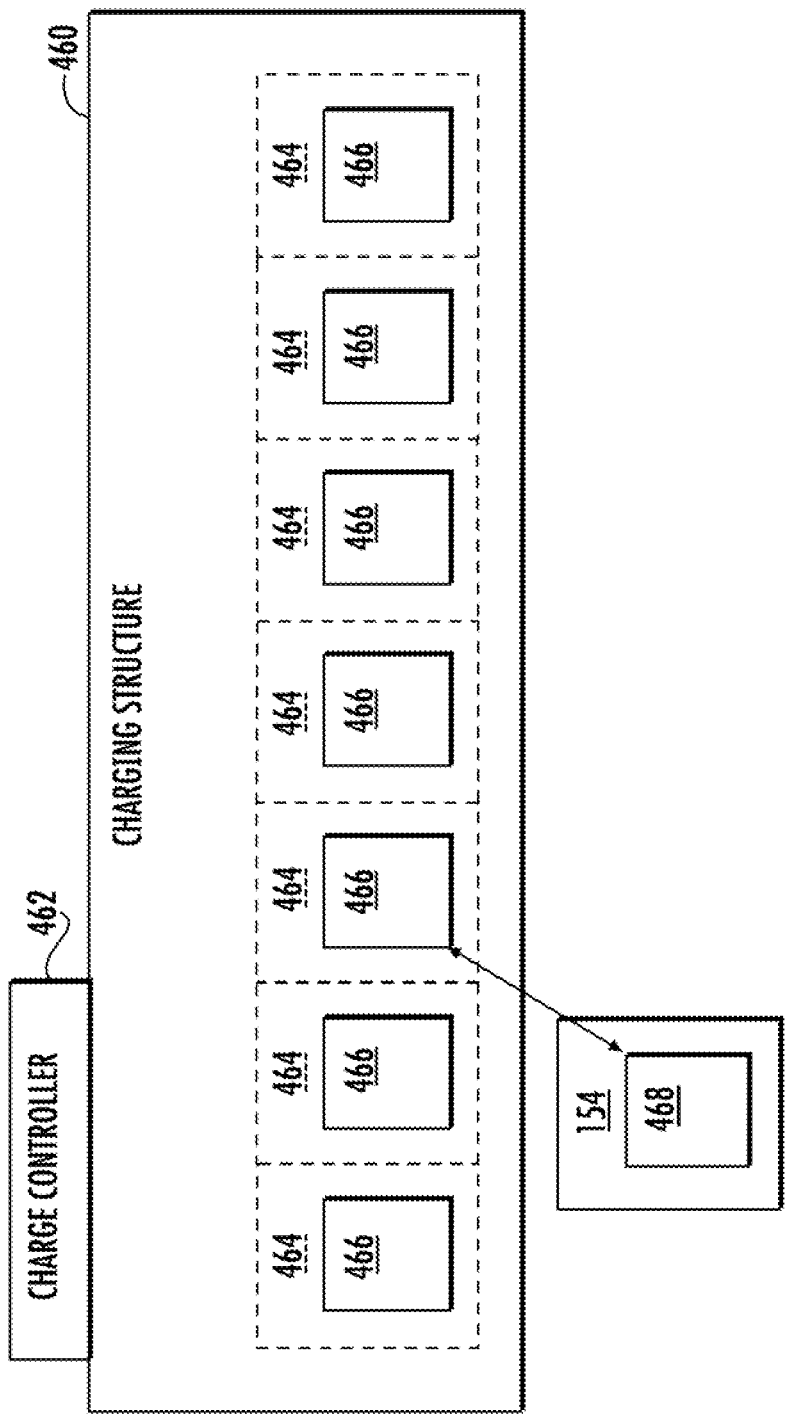
FIG. 9 depicts a third example charging structure embodiment according to example embodiments of the present disclosure.

FIG. 9 depicts a third exemplary charging structure 460. In some examples charging structure 460 can correspond to a battery charging structure including one or more battery charging stations configured to charge energy storage devices that are removable from a vehicle. In some implementations, charging structure 460 as well as other charging structures described herein can include a combination of vehicle charging stations and/or battery charging stations and associated components. Vehicle charging stations can be configured to charge an energy storage device located in or otherwise associated with a vehicle without removing the energy storage device from the vehicle. Battery charging stations can be configured to charge vehicle energy storage devices that are removable from a vehicle such that energy storage devices can be swapped with other energy storage devices located at a charging structure.

Referring more particularly to FIG. 9, charging structure 460 can include a charge controller 462, one or more charging stations 464, and an energy transfer system 465. Each of the charging stations 464 can correspond to a receptacle or other device configured to receive or otherwise be electrically coupled to an energy storage device 466. Energy transfer system 465 can interface with and selectively charge each energy storage device(s) 466. Although a single energy transfer system 465 is depicted in FIG. 9, it should be appreciated that multiple energy transfer systems 465 can be provided in other implementations. For instance, a dedicated energy transfer system 465 can be provided for each of the charging stations 464 and corresponding energy storage device(s) received therein. The charge controller 462 can be coupled to the energy transfer system 465 and configured to determine a current state of charge for each energy storage device 466 currently provided within charging structure 460. Charge controller 462 can control the charge of each energy storage device 446 in accordance with one or more charging control signals 282. In some examples, charge controller 462 can include a central control system 202 as described in FIG. 6.

When a vehicle 154 arrives at charging structure 460, a current energy storage device 468 located in or otherwise associated with vehicle 154 can be swapped with one of the energy storage devices 466 located at charging structure 460 that has more charge than current energy storage device 468. Charge controller 462 can monitor the state of charge of all energy storage devices 466 within charging structure 460 so that an identification signal can be provided to vehicle 154 indicating which energy storage device 466 to swap with current energy storage device 468. In some examples, such an identification signal will direct vehicle 154 to replace current energy storage device 468 with one of the energy storage devices 466 that is fully charged by energy transfer system 465. Once current energy storage device 468 becomes one of the energy storage devices 466 at charging structure 460, charge control signals can selectively control the positive and/or negative charging of such device until it is selected for use in another vehicle 154.

Figure 10:
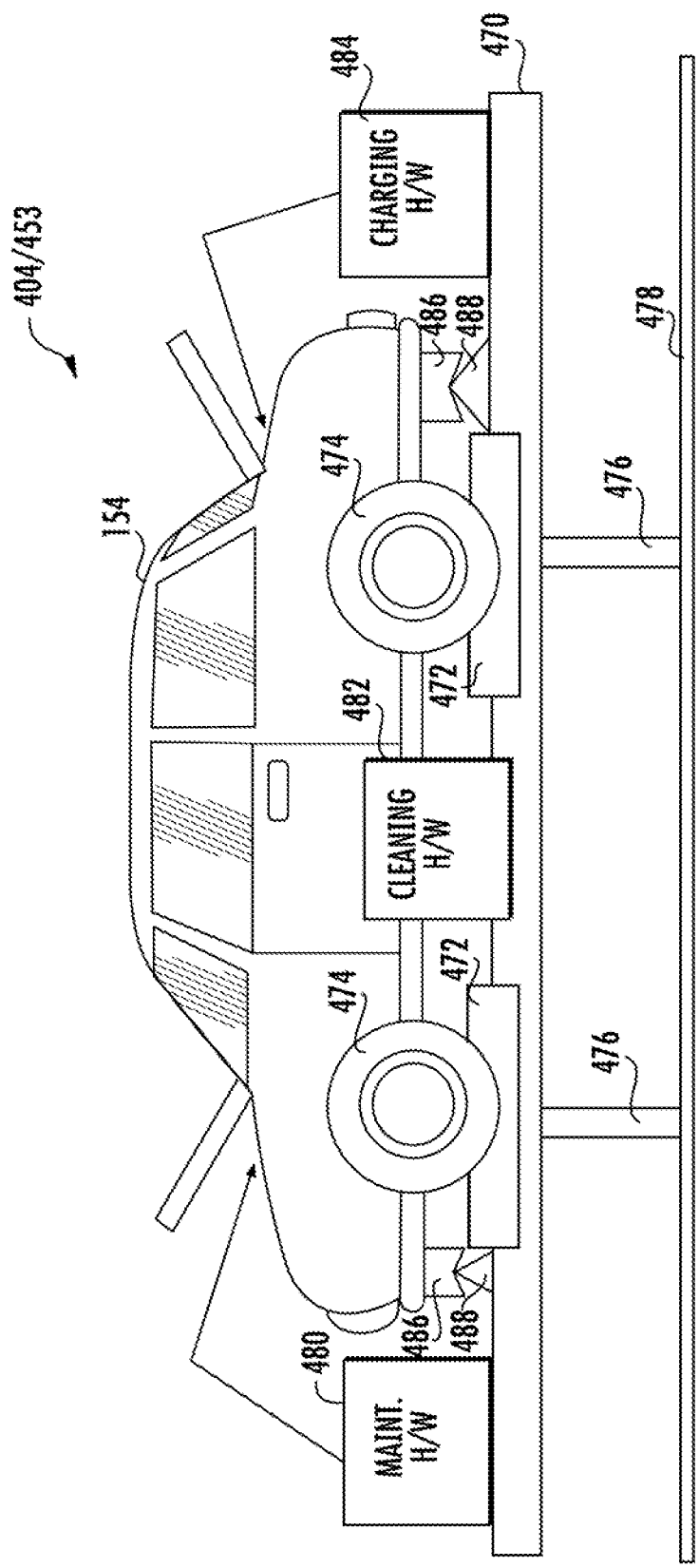
FIG. 10 depicts an example charging station within a charging structure according to example embodiments of the present disclosure.

FIG. 10 depicts additional example features that may optionally be included within a charging station, such as charging stations 404 of FIG. 7 and/or charging stations 453 of FIG. 8. For example, each charging station 404/453 can include a platform 470 onto which a vehicle 154 can be received. The inclusion of platforms 470 or other features for receiving vehicles in precise locations within a charging structure can advantageously afford automated maneuvering and servicing of a vehicle within a charging structure. This can provide beneficial savings for cost, labor, manpower, safety and other expenses associated with vehicle charging and/or servicing. Space savings can also be advantageously realized within a charging structure and/or charging stations therein by providing platform-based features for receiving vehicles. Vehicles received on a platform 470 can be maneuvered throughout the interior of a charging structure with relative ease, especially since positional changes of a vehicle platform 470 can be more dynamic than a conventionally driven vehicle that can sometimes be subject to larger turning radius requirements and the like.

In some implementations, platform 470 can include alignment blocks 472 and/or other mechanical features for positioning and/or securing wheels 474 of vehicle 154 onto platform 470. In some implementations, platform 470 can include one or more first alignment connectors 488 that are configured to fit with one or more second alignment connectors 486 associated with a vehicle 154. In some implementations, first alignment connectors 488 located on or near platform 170 can be male connectors, while second alignment connectors 486 located on or otherwise associated with vehicle 154 can include female connectors. First alignment connectors 488 and second alignment connectors 486 are configured to precisely position vehicle 154 relative to platform 170 so that automated servicing, charging, cleaning, maintenance, etc. can be implemented. In some examples, first alignment connectors 488 and second alignment connectors 486 can be positioned in order to provide not only a mechanical connection point between vehicle 154 and platform 170, but also an electrical connection point for conductively charging an energy storage device located within vehicle 154. Charging station 404/453 can include one or more lift mechanisms 476 that can selectively elevate platform 470 and vehicle 154 positioned thereon relative to a ground surface 478.

Charging station 404/453 also can include maintenance hardware 480 on or near vehicle platform 470 configured to robotically implement maintenance tasks needed within vehicle 154. Example maintenance tasks implemented by maintenance hardware 480 can include, but are not limited to, maintenance of vehicle operating components (e.g., tires, fluids, brakes, etc.), maintenance of vehicle control system components (e.g., downloading data stored within vehicle control system 204 and/or upgrading software instructions stored within vehicle control system 204), and other tasks that may be needed in accordance with routinely scheduled maintenance or maintenance issues that may arise unexpectedly.

Charging station 404/453 also can include cleaning hardware 482 on or near vehicle platform 470 configured to robotically implement cleaning tasks needed for vehicle 154. Example cleaning tasks implemented by cleaning hardware 482 can include, but are not limited to, cleaning a vehicle interior by vacuuming, wiping surfaces, etc. and/or cleaning a vehicle exterior.

Charging station 404/453 also can include fueling/charging hardware 484, which can correspond, for example, to features provided within energy transfer system 406 as previously described. Fueling/charging hardware 484 can additionally or alternatively include charging/fueling hardware configured to robotically implement robotic fueling of powertrain system components on various vehicles 154. For example, fueling components for transferring liquids and/or gas fuels (e.g., gasoline, diesel, liquefied natural gas (LNG), hydrogen, to a vehicle 154 for use by one or more vehicle power units (e.g., internal combustion engine (ICE), turbine engine, other engine, fuel cell, or other power unit).

Figure 11:
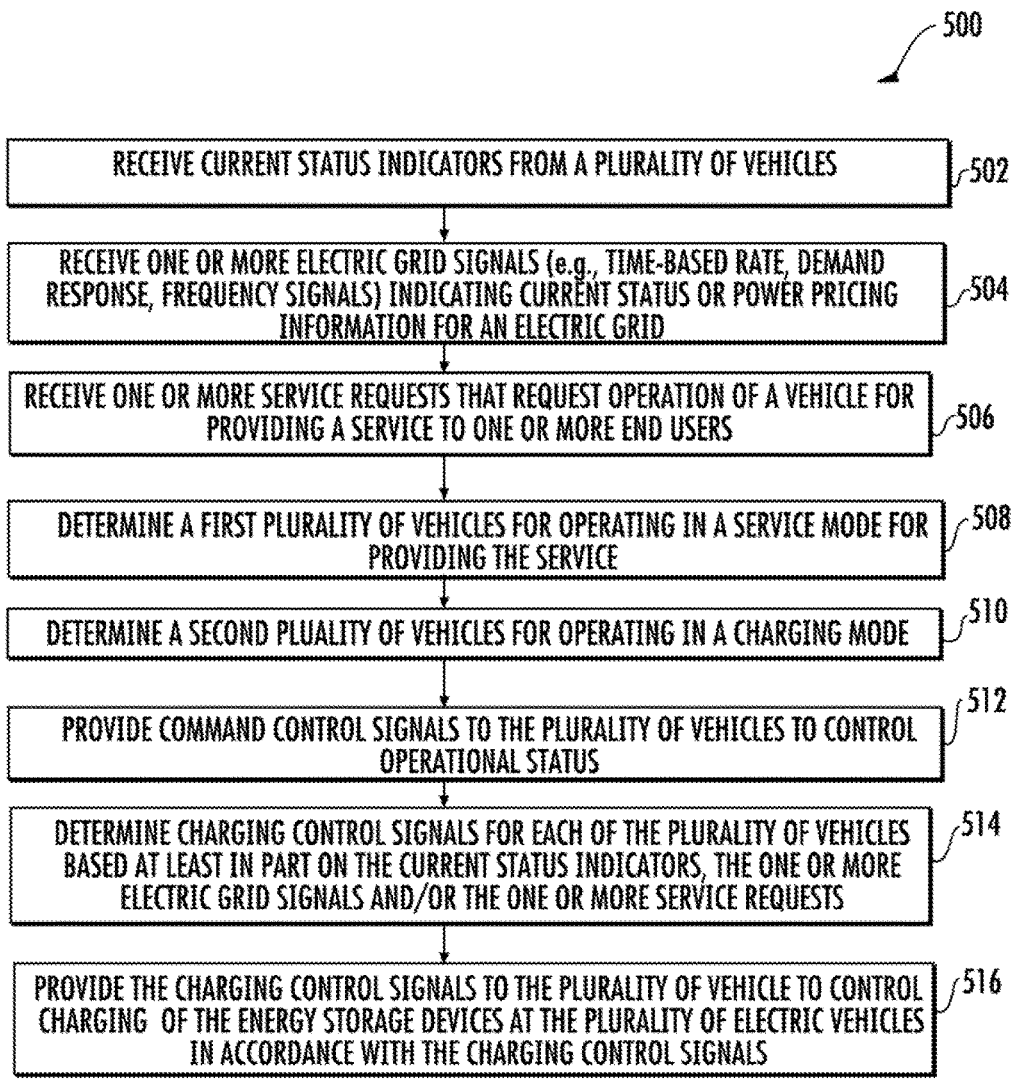
FIG. 11 depicts a flow diagram of an example method for controlling charge of a fleet of vehicles according to example embodiments of the present disclosure.

Referring now to FIG. 11, an example method (500) for controlling charge of a fleet of vehicles is depicted. Method (500) can be implemented, for example, by one or more computing systems within central control system 202 associated with a fleet operator and/or a charging structure 150. Method (500) can include receiving (502) current status indicators from a plurality of vehicles. Current status indicators received at (502) can correspond, for example, to the current status indicators 252 of FIG. 3 (e.g., a current geographic location for a vehicle 154 as determined from one or more location sensors, a current state of charge of one or more energy storage devices located onboard the vehicle 154 as determined by one or more charge sensors, a current operational status such as a service mode or a charging mode to which the vehicle 154 is currently assigned).

Method (500) also can include receiving (504) one or more electric grid signals indicating current status or power pricing information for an electric grid. For example, the one or more electric grid signals received at (504) can include one or more of time-based rate signals that provide power pricing rates for consuming energy during different increments of time, demand response signals providing power pricing rates for increasing generation or supply and/or for reducing consumption or demand as needed to support operational requirements of a local electric grid, and/or power pricing rates for short term voltage and frequency signal adjustments as needed to support operational requirements of a local electric grid. In some examples, the one or more electric grid signals received at (504) correspond to signals similar in form to signals 260, 270, 272 and/or 274 such as depicted in FIG. 4.

Method (500) also can include receiving (506) one or more vehicle service requests that request operation of a vehicle for providing a vehicle service to one or more end users. For example, vehicle service requests received at (506) can correspond to vehicle service requests 254 depicted in FIG. 3. In some examples, vehicle service requests received at (506) can include data identifying a total volume (N) of vehicle service requests within one or more geographic areas at a given point in time or within a given portion of time.

Method (500) also can include determining (508) a first plurality of vehicles for operating in a service mode for providing the vehicle service requested by the one or more vehicle service requests received at (506). Simultaneously with determining (508) or as part of a separate determining (510), a second plurality of vehicles for operating in a charging mode is also determined. The second plurality of vehicles determined at (508) to operate in a charging mode can be sent to charge or discharge their energy storage devices at a current time or at a predetermined future time. In some examples, a command control signal can be provided at (512) to each of the plurality of vehicles in the fleet to control operation of the vehicles in accordance with their assigned operational status (e.g., either being assigned to the first plurality of vehicles operating in a service mode or the second plurality of vehicles operating in a charging mode). In some examples, the instructions for assigning a vehicle into a first plurality (e.g., service mode) or second plurality (e.g., charging mode) contained within command control signal provided at (512) is alternatively included with the charging control signal provided at (516).

Figure 12:
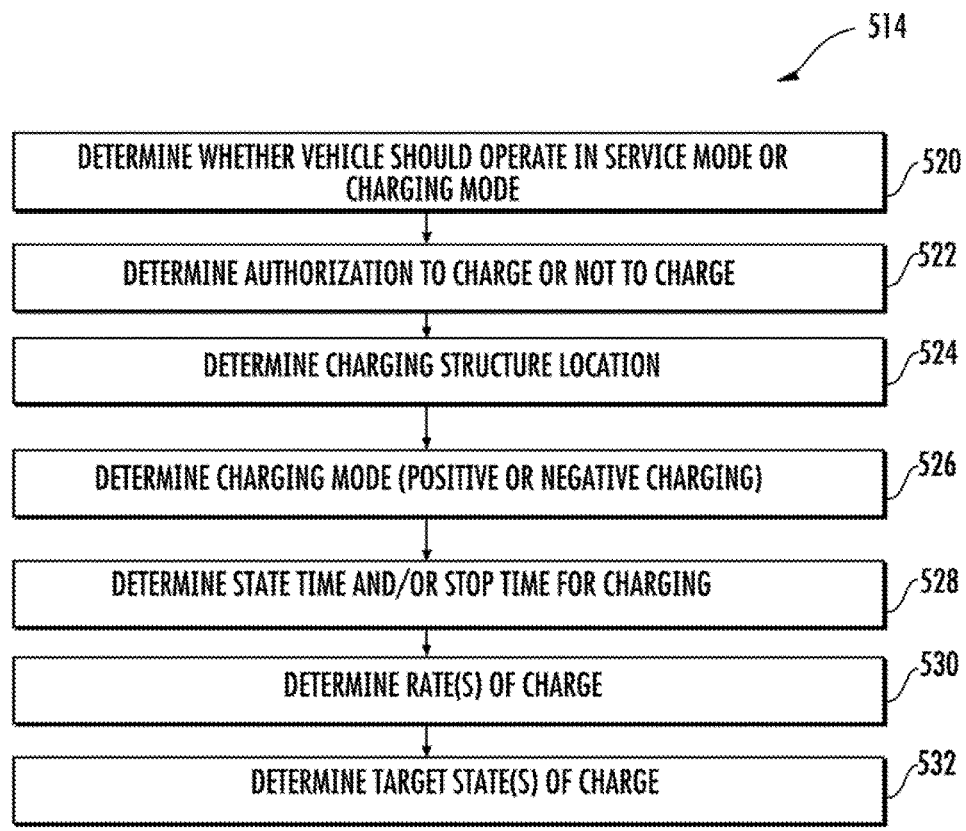
FIG. 12 depicts a flow diagram of an example method of determining a charging control signal according to example embodiments of the present disclosure.

Method (500) also can include determining (514) a charging control signal for each of the plurality of vehicles in a fleet or for at least a subset of vehicles in a fleet (e.g., those in the second plurality of vehicles determined at (510)). A charging control signal determined at (514) can include one or more of authorization instructions 283, location instructions 284, charging mode instructions 285, charging time instructions 286, rate of charge instructions 287, and/or target state of charge instructions 288 as described with reference to FIG. 5. FIG. 12 depicts more particular aspects of determining (514) a charging control signal. For example, if a separate command control signal is not already provided at (512), then determining charging control signal at (514) can include determining at (520) whether a vehicle should operate in the first plurality of vehicles for a service mode or a second plurality or vehicles for a charging mode. Determining (514) charging control signal also can include determining (522) an authorization or lack of authorization, for example in the form of instructions authorizing a vehicle to start charging and/or an instruction for the vehicle to not charge. Determining (514) charging control signal also can include determining (524) a charging structure location, for example, in terms of a unique identifier for a charging structure that can be used to access a table or other database of information associated with all charging structures 150 in a nearby geographic area, a specific street address for a charging structure and/or particular geographic coordinates (e.g., latitude and longitude values) at which a charging structure is located. In some examples, charging structure locations determined at (524) can be determined based on specific locations within an electric grid that are in need of extra power generation during a portion of time as indicated in demand response and/or frequency signals received from an electric grid control system. Determining (514) charging control signal also can include determining (526) a charging mode, for example a positive charging mode (e.g., a charging mode during which the charge level of an energy storage device 330 increases corresponding to power consumption by a vehicle 154) or a negative charging mode (e.g., a charging mode during which the charge level of an energy storage device 330 decreases corresponding to power generation by a vehicle 154). Determining (514) charging control signal also can include determining (528) a start time and/or stop time for charging an energy storage device 330, determining (530) a rate of charge for charging an energy storage device 330 and/or determining (532) a target state of charge at which a vehicle can finish operating in a charging mode.

Referring again to FIG. 11, the determined command control signals including assignment of a vehicle as being in either a first plurality of vehicles at (508) or a second plurality of vehicles at (510) and/or the charging control signals determined at (514) can be determined, at least in part, from the current status indicators of the vehicles received at (502), the one or more electric grid signals indicating current status or power pricing information for the electric grid received at (504) and/or the service requests received at (506). In some examples, current values for data or related parameters included in one or more of the current status indicators received at (502), the one or more electric grid signals received at (504) or the one or more service requests received at (506) can be compared to threshold values in determining command control signals at (508/510) and/or determining charging control signals at (514). In some examples, current values for data or related parameters included in one or more of the current status indicators received at (502), the one or more electric grid signals received at (504) or the one or more service requests received at (506) can be assigned one or more weights so that the regular values and/or weighted values for each parameter are used in a scoring formula for determining whether to assign a vehicle to the first plurality at (508) or the second plurality at (510) as well as for determining specific instructions for inclusion within the charging control signals determined at (514).

For example, assigning a given vehicle into the second plurality of vehicles determined at (510) to operate in a charging mode may be more likely when current status indicators received at (502) identify the given vehicle as having a current state of charge that is below one or more predetermined threshold levels. In some examples, assigning a given vehicle into the second plurality of vehicles determined at (510) to operate in a charging mode may be less likely when the one or more electric grid signals received at (504) indicate that a time-based rate for power pricing is higher than a predetermined threshold level. Conversely, taking a vehicle from the first plurality determined at (508) into the second plurality determined at (510) may be more likely when electric grid signals (510) include a demand response signal or frequency response signal indicating a current need for transfer of power to an electric grid. In another example, keeping a vehicle in the first plurality determined at (508) to operate in a service mode may be more likely when the total volume (N) of service requests received at (506) exceeds a predetermined threshold level.

Referring still to FIG. 11, method (500) also can include providing at (516) the charging control signals determined at (514) to the plurality of vehicles (e.g., by providing a unique charging control signal determined for each vehicle in the fleet to the corresponding vehicle). Providing charging control signals at (516) then can be used at each vehicle to control charging of one or more energy storage devices at each vehicle in accordance with the charging control signal.

Figure 13:
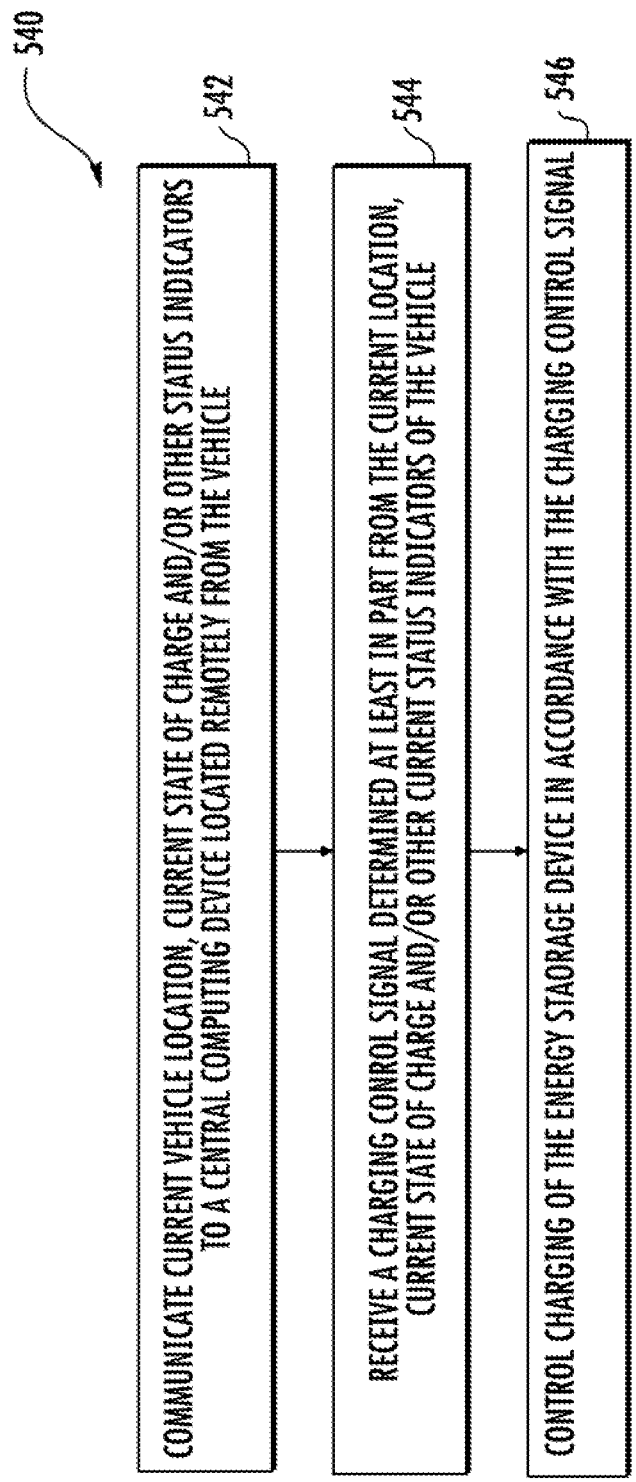
FIG. 13 depicts a flow diagram of an example method of controlling charge of an energy storage device according to example embodiments of the present disclosure.

Referring now to FIG. 13, a method (540) for controlling charge of an energy storage device can be performed, for example, by one or more vehicle control systems 204 located at a vehicle 154. Method (540) can include communicating (542), by one or more computing devices 300 provided within vehicle control system 204, one or more current status indicators 252 associated with the vehicle 154 to a central computing system 202 located remotely from the vehicle 154. In some examples, the one or more current status indicators 252 communicated at (542) can include a current vehicle location (e.g., as determined by one or more location sensors 328) and/or current state of charge of an energy storage device (e.g., as determined by one or more charge sensors 331) within vehicle and/or a current operational state of the vehicle (e.g., service mode or charging mode). Method (540) also can include receiving (544) a charge control signal determined, at least in part, from the current status indicators communicated at (542) and/or from optional additional information such as electric grid signals and/or a volume of vehicle service requests received from end user devices as previously described. Method (540) also can include controlling (546) charging of an energy storage device 330 in vehicle 154 in accordance with the charging control signal received at (544).

Figure 14:
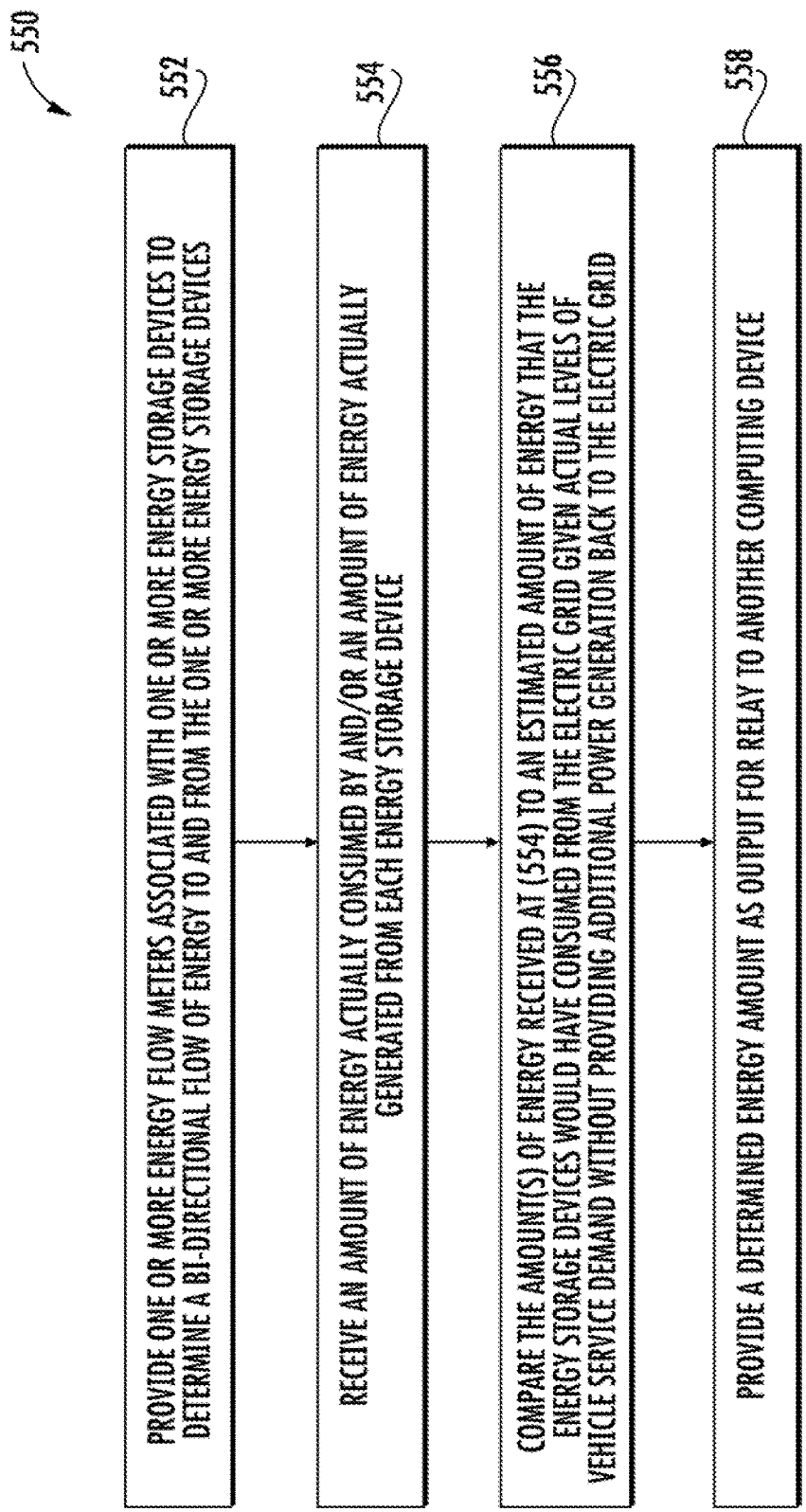
FIG. 14 depicts a flow diagram of an example method of verifying one or more performance factors associated with the disclosed systems and methods for controlling charge of a mobile energy storage fleet according to example embodiments of the present disclosure.

Referring now to FIG. 14, a method (550) for verifying fleet charging effects on an electric grid can be implemented at least in part by monitoring hardware provided within vehicles and/or charging structures. Method (550) can include providing at (552) one or more energy flow meters associated with one or more energy storage devices to determine a bi-directional flow of energy to and from the one or more energy storage devices. In some examples, the energy flow meter(s) provided at (552) can correspond to a kilowatt (kW) hour meter 342 provided as part of vehicle powertrain system 310. In other examples, the energy flow meter(s) provided at (552) can be part of the energy transfer system(s) and/or charging stations at a charging structure, such as depicted in FIGS. 7-9.

Method (540) can also include requesting/receiving (554) by one or more computing devices (e.g., by one or more computing devices provided at a central location such as a charging structure 400/450/460 and/or central control system 202) an amount of energy actually consumed by and/or an amount of energy actually generated from each energy storage devices as determined by the energy flow meters provided at (552).

Method (550) can also include comparing (556) the amount(s) of energy received at (554) to an estimated amount of energy that the energy storage devices would have consumed from the electric grid given actual levels of vehicle service demand without providing additional power generation back to the electric grid. In some examples, comparing at (556) can result in an energy differential that quantifies the amount of energy savings realized at the electric grid by the controlled charging/discharging of a mobile energy storage fleet. Comparing at (556) can additionally or alternatively correspond to determining an amount of energy savings relative to a contracted amount agreed upon between the fleet operator functioning as an energy provider (contractor) and an electric grid operator (contractee) as a result of demand response or frequency regulation requests from the electric grid operator.

Method (550) can also include providing (558) determined energy amounts as output for relay to another computing device. In some instances, the determined energy amounts include one or more of the amounts of consumed/generated energy received at (554) and/or the energy differential determined from comparing at (556) to another computing device. In some examples, providing at (558) can include providing determined energy amounts to a stakeholder of an electric grid, such as an electric grid manager, energy provider, power pricing controller, etc. In some examples, providing at (558) can be implemented by one or more computing devices provided at a central control system 202. In some examples, providing at (558) can include providing the metered result 259 indicated in FIG. 3 from central control system 202 to electric grid control system 208.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for controlling charge of a fleet of vehicles, comprising:
   receiving, by a computing system comprising one or more computing devices, current status indicators from a plurality of vehicles;
   receiving, by the computing system, one or more electric grid signals indicating current status or power pricing information for an electric grid;
   receiving, by the computing system, service request data associated with a plurality of vehicle service requests that respectively request operation of a vehicle from the plurality of vehicles for providing a transportation service to one or more end users, wherein the transportation service comprises one or more of a rideshare service, a courier service, or delivery service, and wherein the service request data includes a volume of the vehicle service requests within one or more geographic areas;
   determining, by the computing system, charging control signals for each of the plurality of vehicles, wherein the charging control signals are determined, at least in part, from the current status indicators of the vehicles, the service request data, and the one or more electric grid signals indicating current status or power pricing information for the electric grid; and
   providing, by the computing system, the charging control signals to the plurality of vehicles to control charging of energy storage devices at the plurality of vehicles in accordance with the charging control signals.

2. The method of claim 1, further comprising:
   determining, by the computing system, a first plurality of vehicles for operating in a service mode for providing the transportation service; and
   determining, by the computing system, a second plurality of vehicles for operating in a charging mode, and wherein the charging control signals are provided to the second plurality of vehicles.

3. The method of claim 1, wherein the one or more electric grid signals comprises a time-based rate signal providing one or more power pricing rates for consuming energy during different increments of time.

4. The method of claim 1, wherein the one or more electric grid signals comprises a demand response signal providing power pricing rates for increased generation or reduced consumption as needed to support local grid demand requirements.

5. The method of claim 1, wherein the one or more electric grid signals comprises a frequency signal providing power pricing rates for short term frequency signal adjustment as needed to support local grid frequency requirements.

6. The method of claim 1, wherein the charging control signals comprise one or more of authorization instructions to initiate a start of charging for each energy storage device or to request not charging for each energy storage device, location instructions for determining a vehicle charging structure for charging each vehicle, charging mode instructions specifying a positive charging mode for energy consumption from the electric grid or a negative charging mode for energy generation to the electric grid, charging time instructions for determining a charging start time or a charging stop time, rate of charge instructions that specify a current rate of charge for charging each energy storage device, and target state of charge instructions that specify a target state of charge desired for the energy storage device.

7. An autonomous computing system comprising:
   one or more processors; and
   one or more non-transitory computer-readable media that store instructions that, when executed by the one or more processors, cause the autonomous computing system to perform operations, the operations comprising:

receiving current status indicators from a plurality of vehicles;

receiving one or more electric grid signals indicating current status or power pricing information for an electric grid;

receiving service request data associated with a plurality of vehicle service requests that request operation of a vehicle from the plurality of vehicles for providing a transportation service to one or more end users, wherein the transportation service comprises one or more of a rideshare service a courier service, or delivery service, and wherein the service request data includes a volume of the plurality of vehicle service requests within one or more geographic areas;

determining charging control signals for each of the plurality of vehicles, wherein the charging control signals are determined; at least in part, from the current status indicators of the vehicles, the service request data, and the one or more electric grid signals indicating current status or power pricing information for the electric grid; and providing the charging control signals to the plurality of vehicles to control charging of energy storage devices at the plurality of vehicles in accordance with the charging control signals.

8. The computing system of claim 7, the operations further comprising:

determining a first plurality of vehicles for operating in a service mode for providing the transportation service; and determining a second plurality of vehicles for operating in a charging mode; and wherein the charging control signals are provided to the second plurality of vehicles.

9. The computing system of claim 7, wherein the one or more electric grid signals comprises a time-based rate signal providing one or more power pricing rates for consuming energy during different increments of time.

10. The computing system of claim 7, wherein the one or more electric grid signals comprises a demand response signal providing power pricing rates for increased generation or reduced consumption as needed to support local grid demand requirements.

11. The computing system of claim 7, wherein the one or more electric grid signals comprises a frequency signal providing power pricing rates for short term frequency signal adjustment as needed to support local grid frequency requirements.

12. The computing system of claim 7, wherein the charging control signals comprise authorization instructions to initiate a start of charging for each energy storage device or to request not charging for each energy storage device.

13. The computing system of claim 7, wherein the charging control signals comprise location instructions for determining a vehicle charging structure for charging each vehicle.

14. The computing system of claim 7, wherein the charging control signals comprise charging mode instructions specifying a positive charging mode for energy consumption from the electric grid or a negative charging mode for energy generation the electric grid.

15. The computing system of claim 7, wherein the charging control signals comprise charging time instructions for determining one or more of a charging start time and a charging stop time.

16. The computing system of claim 7, wherein the charging control signals comprise rate of charge instructions that specify a current rate of charge for charging each energy storage device.

17. The computing system of claim 7, wherein the charging control signals comprise target state of charge instructions that specify a to charge desired for the energy storage device.

18. One or more non-transitory computer-readable media that store instructions that, when executed by one or more processors, cause the one or more processors to perform operations, the operations comprising:

receiving current status indicators from a plurality of vehicles;

receiving one or more electric grid signals indicating current status or power pricing information for an electric grid;

receiving service request data associated with one or more vehicle service requests that respectively request operation of a vehicle from the plurality of vehicles for providing a transportation service to one or more end users, wherein the transportation service comprises one or more of a rideshare service, a courier service, or delivery service, and wherein the service request data includes a volume of the one or more vehicle service requests within one or more geographic areas;

determining a first portion of the plurality of vehicles for operating in a service mode for providing the transportation service;

determining a second portion of the plurality of vehicles for operating in a charging mode;

determining charging control signals for each vehicle in the second portion of the plurality of vehicles, wherein the charging control signals are determined, at least in part, from the current status indicators of the vehicles, the service request data, and the one or more electric grid signals indicating current status or power pricing information for the electric grid; and providing the charging control signals to the second portion of the plurality of vehicles to control charging of energy storage devices at the plurality of vehicles in accordance with the charging control signals.

19. The one or more non-transitory computer-readable media of claim 18, wherein the one or more electric grid signals comprise one or more of a time-based rate signal providing one or more power pricing rates for consuming energy during different increments of time, a demand response signal providing power pricing rates for increased generation or reduced consumption as needed to support local grid demand requirements, and a frequency signal providing power pricing rates for short term frequency signal adjustment as needed to support local grid frequency requirements.

20. The one or more non-transitory computer-readable media of claim 18, wherein the charging control signals comprise one or more of authorization instructions to initiate a start of charging for each energy storage device or to request not charging for each energy storage device, location instructions for determining a vehicle charging structure for charging each vehicle, charging mode instructions specifying a positive charging mode for energy consumption from the electric grid or a negative charging mode for energy generation to the electric grid, charging time instructions for determining a charging start time or a charging stop time, rate of charge instructions that specify a current rate of charge for charging each energy storage device, and target state of charge instructions that specify a target state of charge desired for the energy storage device.

\* \* \* \* \*